US012785767B2

(12) United States Patent
Zeng et al.

(10) Patent No.: US 12,785,767 B2
(45) Date of Patent: Nov. 3, 2026

(54) ANTENNA-UNDER-DISPLAY MANAGEMENT METHOD AND APPARATUS

(71) Applicant: HUAWEI TECHNOLOGIES CO., LTD., Shenzhen (CN)

(72) Inventors: Kun Zeng, Chengdu (CN); Guangjian Wang, Chengdu (CN); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 355 days.

(21) Appl. No.: 18/317,603

(22) Filed: May 15, 2023

(65) Prior Publication Data

US 2023/0318672 A1 Oct. 5, 2023

Related U.S. Application Data

(63) Continuation of application No. PCT/CN2021/104475, filed on Jul. 5, 2021.

(30) Foreign Application Priority Data

Nov. 16, 2020 (CN) ......................... 202011281057.5

(51) Int. Cl.
*H04B 7/06* (2006.01)
*H01Q 1/24* (2006.01)
*H01Q 21/06* (2006.01)

(52) U.S. Cl.
CPC ........... *H04B 7/0608* (2013.01); *H01Q 1/243* (2013.01); *H01Q 21/061* (2013.01)

(58) Field of Classification Search
CPC .......... H01Q 1/243; H01Q 21/28; H01Q 1/44; H01Q 1/245; H01Q 21/0025; H01Q 3/24; H01Q 21/08; H01Q 21/205; H01Q 1/48; H01Q 21/065; H01Q 25/00; H01Q 5/35; H01Q 1/2266; H01Q 1/52; H01Q 21/06;
(Continued)

(56) References Cited

U.S. PATENT DOCUMENTS 9,641,229 B2 * 5/2017 Islam .................. H01Q 21/061
12,323,214 B2 * 6/2025 Park .................... H04B 7/0608
(Continued)

FOREIGN PATENT DOCUMENTS

CN 106850959 A 6/2017
CN 108337025 A 7/2018
CN 111448769 A 7/2020

OTHER PUBLICATIONS

Extended European Search Report issued in corresponding European Application No. 21890646.9, dated Apr. 15, 2024, pp. 1-9.
(Continued)

*Primary Examiner* — Golam Sorowar
(74) *Attorney, Agent, or Firm* — HAUPTMAN HAM, LLP

(57) ABSTRACT

Antenna-under-display management method and apparatus. Antenna-under-display blocking information of a device is obtained. A first antenna set is determined based on the antenna-under-display blocking information, wherein an antenna in the first antenna set is an unblocked antenna. Signal transmission is performed by using the first antenna set. The first antenna set is a subset of a second antenna set, and the second antenna set is constituted by an unblocked antenna-under-display of the device.

20 Claims, 11 Drawing Sheets

(58) Field of Classification Search
CPC ...... H01Q 21/24; H01Q 25/001; H01Q 3/247; H01Q 3/34; H01Q 3/36; H01Q 9/0407; H01Q 1/125; H01Q 1/24; H01Q 1/246; H01Q 1/273; H04B 7/0617; H04B 7/0404; H04B 17/318; H04B 7/0608; H04B 7/0874; H04B 7/04; H04B 7/0691; H04B 7/0695; H04B 1/3838; H04B 7/0802; H04B 7/0602; H04B 7/0814; H04B 1/0064; H04B 7/0817; H04B 7/0825
See application file for complete search history.

(56) References Cited

U.S. PATENT DOCUMENTS

| | | | | |
|---|---|---|---|---|
| 2020/0136234 | A1 | 4/2020 | Paulotto et al. | |
| 2023/0089409 | A1* | 3/2023 | Woo | H01Q 9/0407 455/73 |
| 2023/0327831 | A1* | 10/2023 | Xu | H04W 24/08 370/329 |
| 2023/0400326 | A1* | 12/2023 | Zhang | H04B 17/318 |

OTHER PUBLICATIONS

International Search Report issued in corresponding International Application No. PCT/CN2021/104475, dated Aug. 30, 2021, pp. 1-10.

* cited by examiner (a)

(b)

ANTENNA-UNDER-DISPLAY MANAGEMENT METHOD AND APPARATUS

CROSS-REFERENCE TO RELATED APPLICATIONS

This application is a continuation of International Application No. PCT/CN2021/104475, filed on Jul. 5, 2021, which claims priority to Chinese Patent Application No. 202011281057.5, filed on Nov. 16, 2020. The disclosures of the aforementioned applications are hereby incorporated by reference in their entireties.

BACKGROUND

With vigorous development of a consumer electronic market, electronic devices having a screen display function, such as smartphones, tablets, and smartwatches, are widely used in our daily lives. With popularization of mobile Internet applications (for example, short videos and online games), a higher requirement is imposed on a wireless communication capability (for example, antenna performance) that such electronic devices need to support. However, blocking by an object affects normal propagation of electromagnetic signals/optical signals and reduces radiation efficiency of an antenna. As a result, a signal-to-interference and -noise ratio (signal-to-interference-and-noise ratio, SINR) corresponding to a communication link is reduced. This further affects communication quality. Attenuation of the radiation efficiency of the antenna relates to a material of an obstacle. For example, when the obstacle is made of a metal material, the obstacle attenuates the electromagnetic signal more strongly, and when the obstacle is made of a non-transparent material, the obstacle attenuates the optical signal more strongly.

An electronic device having a screen display function generally supports a screen touch operation and a wireless communication function. An evolution trend of such electronic devices is that a screen of the electronic devices becomes larger and a screen-to-body ratio gets higher without increasing an overall size of the product or even in the case that the product is further miniaturized. Therefore, currently, an antenna-under-display (antenna-under-display) technology is to be used for optimization of antenna performance. An antenna-under-display may also be referred to as an antenna-on-display (antenna-on-display). FIG. 1 is a schematic diagram of an antenna-under-display. Radiation efficiency of the antenna is improved by installing the antenna under a screen and utilizing a technical feature that the screen is usually made of a non-metallic material, such as glass and resin, whose electromagnetic signal/optical signal absorption rate is lower than that of a metal shell. However, considering only blocking for an electromagnetic signal/optical signal by the electronic device can only partially improve the radiation efficiency of the antenna.

SUMMARY

Embodiments described herein provide an antenna-under-display management method and apparatus, to further improve radiation efficiency of an antenna.

According to a first aspect, an antenna-under-display management method is provided. The method includes: obtaining antenna-under-display blocking information of a device, determining a first antenna set based on the antenna-under-display blocking information, and performing signal transmission by using the first antenna set. The first antenna set is a subset of a second antenna set, and the second antenna set is constituted by an unblocked antenna-under-display of the device. In other words, each antenna in the first antenna set is an unblocked antenna. This avoids reduction of radiation efficiency of the antenna-under-display that is caused by blocking a screen due to a user operation, an ambient environment, or the like, improves a signal to interference plus noise ratio of a communication link, reduces a quantity of invalid transmissions and repeated transmissions, reduces a transmit power and power consumption of the device, and improves quality of a communication service.

In at least one embodiment, the obtaining antenna-under-display blocking information of a device includes: obtaining screen blocking information of the device, and determining the antenna-under-display blocking information based on the screen blocking information. In at least one embodiment, determining whether an internal module of the device is blocked is converted to determining whether a surface module of the device is blocked, so that the antenna-under-display blocking information is conveniently and accurately determined.

In at least one embodiment, the obtaining screen blocking information of the device, and determining the antenna-under-display blocking information based on the screen blocking information includes: determining a blocked region on a screen of the device; and determining that an antenna-under-display in the blocked region on the screen of the device is a blocked antenna-under-display, or in response to an antenna-under-display being an antenna-under-display array, and a ratio of a quantity of antenna elements in the blocked region on the screen of the device to a quantity of antenna elements in an antenna array to which the antenna elements in the blocked region on the screen of the device belongs is greater than a first threshold, determining that the antenna-under-display in the blocked region on the screen of the device is a blocked antenna-under-display. In at least one embodiment, a specific implementation problem in an application scenario in which some antennas or some antenna elements in an antenna group or an antenna array are blocked in technical solutions of at least one embodiment is effectively solved. In at least one embodiment, the determining a blocked region on a screen of the device includes: determining the blocked region based on a touched region on the screen of the device. In at least one embodiment, a cause-effect relationship between a user operation and blocking is fully utilized to efficiently and quickly determine whether an antenna-under-display is blocked.

In at least one embodiment, the determining a blocked region on a screen of the device includes: obtaining capacitance change information of a region on the screen of the device; and determining the blocked region based on a region in which capacitance changes. In at least one embodiment, a feature of the screen of the device is fully utilized to conveniently and quickly determine which regions on the screen are blocked.

In at least one embodiment, the determining a blocked region on a screen of the device includes: performing blocking detection on the screen of the device by using one or more sensors, to obtain a detection result; and determining the blocked region based on the detection result. In at least one embodiment, blocking detection is performed on a screen region by using an electromagnetic signal and/or an optical signal. This avoids secondary design of the screen, for example, adding of a capacitance layer.

In at least one embodiment, a screen of the device includes a plurality of first regions, there is a correspondence between a first region and an antenna-under-display, and the obtaining antenna-under-display blocking information of a device includes: in response to a blocked proportion of a first region corresponding to a first antenna-under-display being greater than a second threshold, determining that the first antenna-under-display is blocked; and in response to the blocked proportion of the first region corresponding to the first antenna-under-display being less than or equal to the second threshold, determining that the first antenna-under-display is not blocked, where the first antenna-under-display is one of antenna-under-displays of the device. In at least one embodiment, region division is performed on the screen of the device. This determines more efficiently which antenna-under-displays are blocked.

In at least one embodiment, the determining a blocked region on a screen of the device includes: determining the blocked region on the screen of the device based on a position of an obstacle, in a first space, that blocks the screen of the device, where projection of a bottom surface of the first space on a horizontal plane is a screen surface of the device, and a height is a preset value. In at least one embodiment, the obstacle is able to not touch the screen of the device. Therefore, whether the screen is blocked by an obstacle that is untouched but suspended at a short distance is determined, for example, a palm part or an arm part. Which antenna-under-displays that are blocked are able to be more accurately determined.

In at least one embodiment, the determining a blocked region on a screen of the device includes: performing blocking detection on a first space by using one or more sensors, where projection of a bottom surface of the first space on a horizontal plane is a screen surface of the device, and a height is a preset value; and determining the blocked region based on a region formed by projecting a position of an obstacle that blocks the screen of the device and that is in the first space onto the screen of the device. In at least one embodiment, the obstacle does not touch the screen of the device. Therefore, whether the screen is blocked by an obstacle that is untouched but suspended at a short distance is determined, for example, a palm part or an arm part. Which antenna-under-displays are blocked is able to be determined more accurately.

In at least one embodiment, a first space includes M*N subspaces, M is an integer greater than 1, N is an integer greater than 0, projection of a bottom surface of the first space on a horizontal plane is a screen surface of the device, a height is a preset value, the bottom surface of the first space includes M second regions, there is a correspondence between a second region and an antenna-under-display, a space that uses the second region as a bottom surface and whose height is the preset value includes N subspaces, and the obtaining antenna-under-display blocking information of a device includes: in response to a ratio of an area formed by projecting an obstacle that blocks a screen of the device and that is in a first subspace onto the screen to an area of a second region corresponding to a first antenna-under-display being greater than a third threshold, determining that the first antenna-under-display is blocked; and in response to the ratio of the area formed by projecting the obstacle that blocks the screen of the device and that is in the first subspace onto the screen to the area of the second region corresponding to the first antenna-under-display being less than or equal to the third threshold, determining that the first antenna-under-display is not blocked, where the first subspace is a subspace, closest to the screen of the device among subspaces occupied by the obstacle, in the N subspaces corresponding to the second region corresponding to the first antenna-under-display. The first antenna-under-display is one of antenna-under-displays of the device, and the third threshold corresponds to the first subspace. In at least one embodiment, subspace division is performed on the first space. Which antenna-under-displays are blocked is able to be determined more accurately and efficiently.

In at least one embodiment, the preset value relates to one or more of the following: a size of the device, a size of the screen of the device, a transmit power of a communication module of the device, a receive power of the communication module of the device, a communication service type carried by a signal, a frequency for touching the screen for performing a service by the device in a communication process, and a detection capability of the device for the antenna-under-display blocking information. In this optional method, a value of the preset value is reasonably determined, so that a result of determining whether the antenna-under-display is blocked is more reasonable and accurate.

In at least one embodiment, the method further includes: periodically detecting the antenna-under-display blocking information of the device; and updating the second antenna set based on the detected antenna-under-display blocking information of the device. In this optional method, the second antenna set is updated. This ensures that a selected first antenna set is determined based on a latest second antenna set, to ensure communication quality.

In at least one embodiment, after the determining a first antenna set based on the antenna-under-display blocking information, the method further includes: determining whether link quality of a communication link of the device meets a requirement; and in response to the link quality does not meet the requirement, updating the first antenna set. In this optional method, the first antenna set is updated based on the link quality of the communication link, so that a currently used first antenna set meets the link quality requirement of the communication link.

According to a second aspect, an antenna-under-display management apparatus is provided. The apparatus includes a processing unit and a communication unit, where the processing unit is configured to obtain antenna-under-display blocking information of a device; the processing unit is further configured to determine a first antenna set based on the antenna-under-display blocking information, where the first antenna set is a subset of a second antenna set, and the second antenna set is constituted by an unblocked antenna-under-display of the device; and the communication unit is configured to perform signal transmission by using the first antenna set.

In at least one embodiment, the processing unit is specifically configured to: obtain screen blocking information of the device, and determine the antenna-under-display blocking information based on the screen blocking information.

In at least one embodiment, the processing unit is specifically configured to: determine a blocked region on a screen of the device; and determine that an antenna-under-display in the blocked region on the screen of the device is a blocked antenna-under-display, or in response to an antenna-under-displays being an antenna-under-display array, and a ratio of a quantity of antenna elements in the blocked region on the screen of the device to a quantity of antenna elements in an antenna array to which the antenna elements in the blocked region on the screen of the device belongs being greater than a first threshold, determine that the antenna-under-display in the blocked region on the screen of the device is a blocked antenna-under-display.

In at least one embodiment, the processing unit is specifically configured to: determine the blocked region based on a touched region on the screen of the device.

In at least one embodiment, the processing unit is specifically configured to: obtain capacitance change information of a region on the screen of the device; and determine the blocked region based on a region in which capacitance changes.

In at least one embodiment, the processing unit is specifically configured to: perform blocking detection on the screen of the device by using one or more sensors, to obtain a detection result; and determine the blocked region based on the detection result.

In at least one embodiment, a screen of the device includes a plurality of first regions, there is a correspondence between a first region and an antenna-under-display, and the processing unit is specifically configured to: in response to a blocked proportion of a first region corresponding to a first antenna-under-display being greater than a second threshold, determine that the first antenna-under-display is blocked; and in response to the blocked proportion of the first region corresponding to the first antenna-under-display being less than or equal to the second threshold, determine that the first antenna-under-display is not blocked. The first antenna-under-display is one of antenna-under-displays of the device.

In at least one embodiment, the processing unit is specifically configured to: determine the blocked region on the screen of the device based on a position of an obstacle, in a first space, that blocks the screen of the device, where projection of a bottom surface of the first space on a horizontal plane is a screen surface of the device, and a height is a preset value.

In at least one embodiment, the processing unit is specifically configured to: perform blocking detection on a first space by using one or more sensors, where projection of a bottom surface of the first space on a horizontal plane is a screen surface of the device, and a height is a preset value; and determine the blocked region based on a region formed by projecting a position of an obstacle that blocks the screen of the device and that is in the first space onto the screen of the device.

In at least one embodiment, a first space includes M*N subspaces, M is an integer greater than 1, N is an integer greater than 0, projection of a bottom surface of the first space on a horizontal plane is a screen surface of the device, a height is a preset value, the bottom surface of the first space includes M second regions, where there is a correspondence between a second region and an antenna-under-display, a space that uses the second region as a bottom surface and whose height is the preset value includes N subspaces, and the processing unit is specifically configured to: in response to a ratio of an area formed by projecting an obstacle that blocks a screen of the device and that is in a first subspace onto the screen to an area of a second region corresponding to a first antenna-under-display being greater than a third threshold, determine that the first antenna-under-display is blocked; and in response to the ratio of the area formed by projecting the obstacle that blocks the screen of the device and that is in the first subspace onto the screen to the area of the second region corresponding to the first antenna-under-display being less than or equal to the third threshold, determine that the first antenna-under-display is not blocked. The first subspace is a subspace, closest to the screen of the device among subspaces occupied by the obstacle, in the N subspaces corresponding to the second region corresponding to the first antenna-under-display. The first antenna-under-display is one of antenna-under-displays of the device, and the third threshold corresponds to the first subspace.

In at least one embodiment, the preset value relates to one or more of the following: a size of the device, a size of the screen of the device, a transmit power of a communication module of the device, a receive power of the communication module of the device, a communication service type carried by a signal, a frequency for touching the screen for performing a service by the device in a communication process, and a detection capability of the device for the antenna-under-display blocking information.

In at least one embodiment, the processing unit is further configured to: periodically detect the antenna-under-display blocking information of the device; and update the second antenna set based on the detected antenna-under-display blocking information of the device.

In at least one embodiment, after determining the first antenna set based on the antenna-under-display blocking information, the processing unit is further configured to: determine whether link quality of a communication link of the device meets a requirement; and in response to the link quality not meeting the requirement, update the first antenna set.

According to a third aspect, an antenna-under-display management apparatus is provided. The apparatus includes a processor. The processor is connected to a memory, where the memory is configured to store computer-executable instructions, and the processor executes the computer-executable instructions stored in the memory, to implement the method provided in the first aspect. For example, the memory and the processor is integrated together, or is independent components. In response to the memory and the processor being independent components, the memory is located in the antenna-under-display management apparatus, or is located outside the antenna-under-display management apparatus.

In at least one embodiment, the processor includes a logic circuit, and further includes an input interface and/or an output interface. For example, the output interface is configured to perform a sending action in a corresponding method, and the input interface is configured to perform a receiving action in the corresponding method.

In at least one embodiment, the antenna-under-display management apparatus further includes a communication interface and a communication bus. The processor, the memory, and the communication interface are connected through the communication bus. The communication interface is configured to perform receiving and sending actions in the corresponding method. The communication interface is also referred to as a transceiver. Optionally, the communication interface includes at least one of a transmitter and a receiver. In this case, the transmitter is configured to perform a sending action in the corresponding method, and the receiver is configured to perform a receiving action in the corresponding method.

In at least one embodiment, the antenna-under-display management apparatus exists in a product form of a chip.

According to a fourth aspect, an antenna-under-display management apparatus is provided. The apparatus includes a processor and an interface. The processor is coupled to a memory through the interface. In response to the processor executing a computer program or instructions in the memory, any method provided in the first aspect is performed.

According to a fifth aspect, a computer-readable storage medium is provided. The computer-readable storage medium includes computer-executable instructions. In response to the computer-executable instructions being run on a computer, the computer is enabled to perform any method provided in the first aspect.

According to a sixth aspect, a computer program product is provided. The computer program product includes computer-executable instructions. In response to the computer-executable instructions being run on a computer, the computer is enabled to perform any method provided in the first aspect.

For technical effects brought by any implementation of the second aspect to the sixth aspect, refer to technical effects brought by a corresponding implementation of the first aspect. Details are not described herein again.

The solutions in the foregoing aspects are combined on the premise that the solutions are not contradictory.

DESCRIPTION OF EMBODIMENTS

In descriptions of embodiments herein, "/" means "or" unless otherwise specified. For example, A/B may represent A or B. In at least one embodiment, "and/or" describes only an association relationship between associated objects and represents that three relationships exist. For example, A and/or B represent the following three cases: Only A exists, both A and B exist, and only B exists. In the descriptions of embodiments herein, unless otherwise stated, "at least one" means one or more, and "a plurality of" means two or more.

In addition, to clearly describe technical solutions in embodiments described herein, terms such as "first" and "second" are used in embodiments described herein to distinguish between same items or similar items that provide basically same functions or purposes. A person skilled in the art understands that the terms such as "first" and "second" do not limit a quantity or an execution sequence, and the terms such as "first" and "second" do not indicate a definite difference.

The technical solutions in at least one embodiment are applied to a 4th generation (4th generation, 4G) system, various systems evolved based on the 4G system, a 5th generation (5th generation, 5G) system, and various systems evolved based on the 5G system. The 4G system is also referred to as an evolved packet system (evolved packet system, EPS). A core network of the 4G system is referred to as an evolved packet core (evolved packet core, EPC), and an access network is referred to as long term evolution (long term evolution, LTE). A core network of the 5G system is referred to as a 5GC (5G core), and an access network is referred to as new radio (new radio, NR). The technical solutions in embodiments described herein are applicable to a homogeneous network or a heterogeneous network, are applicable to a frequency-division duplex (frequency-division duplex, FDD) system or a time-division duplex (time-division duplex, TDD) system, and are applicable to a low-frequency communication scenario or a high-frequency communication scenario.

Figure 1:
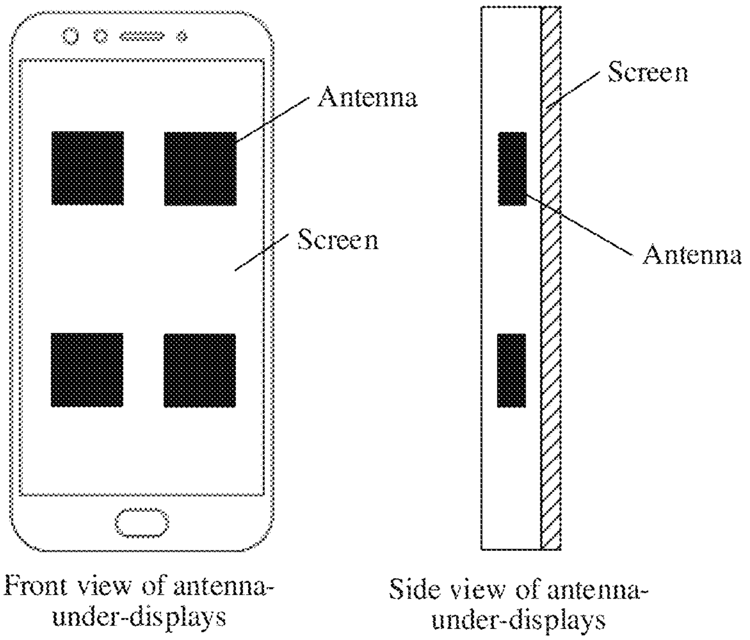
FIG. 1 is a schematic diagram of an antenna-under-display.
Figure 2:
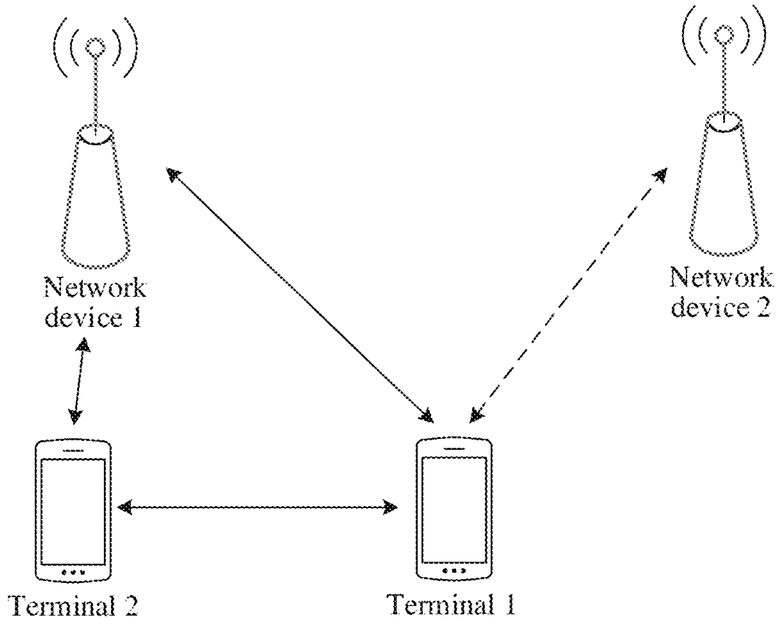
FIG. 2 is a schematic diagram of a communication scenario according to at least one embodiment.

A communication system to which the technical solutions provided in embodiments described herein are applicable includes at least one network device and at least one terminal. One or more terminals in the at least one terminal communicates with one or more network devices in the at least one network device. For example, refer to FIG. 2. One terminal (for example, a terminal 1) communicates with one network device (for example, a network device 1), or communicates with a plurality of network devices (for example, the network device 1 and a network device 2). One terminal (for example, the terminal 1) further communicates with another terminal (for example, a terminal 2).

The network device is an entity that is on a network side and that is configured to send a signal, receive a signal, or send a signal and receive a signal. The network device is an apparatus that is deployed on a radio access network (radio access network, RAN) and that provides a wireless communication function for the terminal, for example, is a transmission reception point (transmission reception point, TRP), a base station, or control nodes in various forms (for example, a network controller and a radio controller (for example, a radio controller in a cloud radio access network (cloud radio access network, CRAN) scenario)). Specifically, the network device is a macro base station, a micro base station (also referred to as a small cell), a relay station, an access point (access point, AP), a satellite, or the like in various forms, or is an antenna panel of a base station, a remote radio head (remote radio head, RRH), or the like. The control nodes is connected to a plurality of base stations, and configure resources for a plurality of terminals within coverage of the plurality of base stations. In systems that use different radio access technologies, names of devices having functions of the base station vary. For example, the device having a function of the base station is referred to as an evolved NodeB (evolved NodeB, eNB or eNodeB) in an LTE system, or is referred to as a next generation node base station (next generation node base station, gNB) in the 5G system or an NR system. A specific name of the base station is not limited in embodiments described herein. The network device is alternatively a network device in a future evolved public land mobile network (public land mobile network, PLMN) or the like.

The terminal is an entity that is on a user side and that is configured to receive a signal, send a signal, or receive a signal and send a signal, and is a wireless communication device that supports a screen touch operation. The terminal is configured to provide one or more of a voice service and a data connectivity service for a user. The terminal is also referred to as user equipment (user equipment, UE), a terminal device, an access terminal, a subscriber unit, a subscriber station, a mobile station, a remote station, a remote terminal, a mobile device, a user terminal, a wireless communication device, a user agent, or a user apparatus. The terminal is a smartphone, a tablet, a smartwatch, a mobile station (mobile station, MS), a subscriber unit (subscriber unit), a drone, an internet of things (internet of things, IoT) device, a station (station, ST) in a wireless local area network (wireless local area network, WLAN), a cellular phone (cellular phone), a smartphone (smartphone), a cordless phone, a wireless data card, a tablet computer, a session initiation protocol (session initiation protocol, SIP) phone, a wireless local loop (wireless local loop, WLL) station, a personal digital assistant (personal digital assistant, PDA) device, a laptop computer (laptop computer), a machine type communication (machine type communication, MTC) terminal, a handheld device having a wireless communication function, a computing device or another processing device connected to a wireless modem, a vehicle-mounted device, or a wearable device (which is also referred to as a wearable intelligent device). Alternatively, the terminal is a terminal in a next-generation communication system, for example, a terminal in a 5G system or a terminal in a future evolved PLMN.

Figure 3:
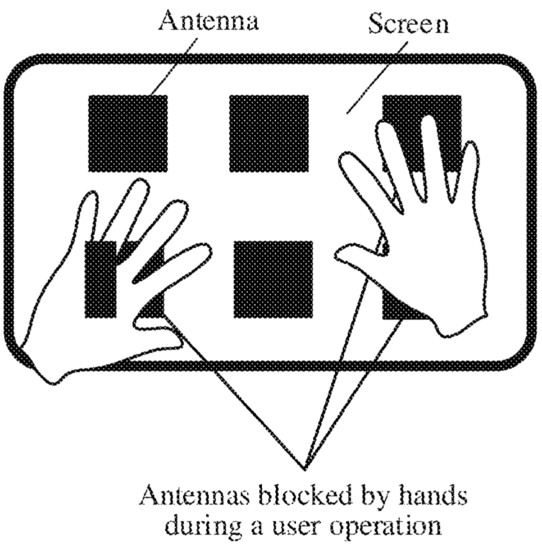
FIG. 3 is a schematic diagram of blocking an antenna by a user operation according to at least one embodiment.

In addition to being affected by blocking by a screen, performance of an antenna-under-display of the terminal is further affected by blocking caused by a user operation, an ambient environment, and the like in an actual use process. This also greatly affects the performance of an antenna-under-display. For example, refer to FIG. 3. A user performs an online game operation by using a tablet computer, and performs game interaction by constantly touching different positions on a screen. At a specific moment, some of antenna-under-displays are blocked by palms. In response to blocking caused by the user operation not being considered, radiation efficiency of the antenna-under-display is weakened. In severe cases, an SINR does not meet a communication requirement. This causes a communication failure. In addition, blocking by a same object has a greater effect on a high-frequency signal (for example, a millimeter wave signal or a submillimeter wave signal) than that on a centimeter wave signal, and optical communication is greatly affected by light brightness. Therefore, a high-frequency communication scenario (for example, a millimeter wave communication scenario, and a submillimeter wave communication scenario) and an optical communication scenario are more sensitive to blocking by an object. Therefore, this problem is particularly prominent in the high-frequency communication scenario and the optical communication scenario.

Figure 4:
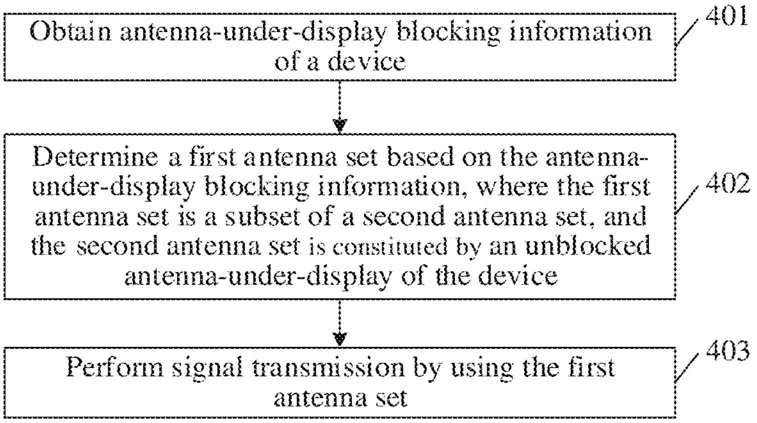
FIG. 4 is a flowchart of an antenna-under-display management method according to at least one embodiment.

To resolve this problem, embodiments described herein provide an antenna-under-display management method. Before signal transmission, an antenna set appropriate for signal transmission is determined based on a blocking status of an antenna-under-display, and the antenna set is used for signal transmission, to improve radiation efficiency of an antenna. Refer to FIG. 4. The method includes the following steps.

401. Obtain antenna-under-display blocking information of a device.

The device in at least one embodiment is a terminal, or is another wireless communication device having a screen display function. The device (for example, the terminal) communicates with a network device or another device (for example, another terminal). This embodiment of this application is performed by the device, or is performed by another device that has a wired or wireless connection to the device. This is not limited in at least one embodiment.

In one case, an antenna in at least one embodiment is an antenna element. In another case, an antenna in at least one embodiment is an antenna array. One antenna array may include one or more antenna subarrays, and one antenna subarray may include one or more antenna elements. In other words, one antenna array may include a plurality of antenna elements. The antenna element is also referred to as an antenna array element or a radiation element.

The antenna-under-display blocking information is used to determine whether an antenna-under-display of the device is blocked.

402. Determine a first antenna set based on the antenna-under-display blocking information, where the first antenna set is a subset of a second antenna set, and the second antenna set is constituted by an unblocked antenna-under-display of the device.

The first antenna set is a proper subset of the second antenna set, or the first antenna set is the same as the second antenna set.

403. Perform signal transmission by using the first antenna set.

Signal transmission includes signal sending and/or signal receiving.

During specific implementation of step 403, the first antenna set is used to perform signal transmission in different transmission modes. For example, signal transmission is performed in a transmission mode such as a single input single output (single input single output, SISO) transmission mode, a multiple input multiple output (Multiple Input Multiple Output, MIMO) transmission mode, or a beamforming (beamforming) transmission mode.

The SISO transmission mode is a transmission mode in which signal transmission is performed by using one antenna at both a transmitting end and a receiving end. The MIMO transmission mode is a transmission mode in which signal transmission is performed by using a plurality of antennas at both the transmitting end and the receiving end. In the MIMO transmission mode, a plurality of spatial transmission channels are generated by using a plurality of transmit antennas and a plurality of receive antennas, so that signals is transmitted in parallel in the plurality of spatial transmission channels, to better utilize spatial resources and improve spectral efficiency. In the beamforming transmission mode, a directional beam is generated by adjusting a weighting coefficient of an antenna. This improves a beam gain and a signal transmission gain.

According to the method provided in at least one embodiment, one or more of unblocked antennas is selected based on the antenna-under-display blocking information to perform signal transmission. This avoids reduction of radiation efficiency of the antenna-under-display that is caused by blocking a screen due to a user operation, an ambient environment, or the like, improves a signal to interference plus noise ratio of a communication link, reduces a quantity of invalid transmissions and repeated transmissions, reduces a transmit power and power consumption of the device, and improves quality of a communication service.

Optionally, during specific implementation, step 401 includes: 401-1. Obtain screen blocking information of the device, and determine the antenna-under-display blocking information based on the screen blocking information.

During specific implementation, step 401-1 includes the following steps:

(11) Determine a blocked region on a screen of the device.

(12) Determine that an antenna-under-display in the blocked region on the screen of the device is a blocked antenna-under-display, or in response to an antenna-under-display being an antenna-under-display array, and a ratio of a quantity of antenna elements in the blocked region on the screen of the device to a quantity of antenna elements in an antenna array to which the antenna elements in the blocked region on the screen of the device belongs being greater than a first threshold, determine that the antenna-under-display in the blocked region on the screen of the device is a blocked antenna-under-display.

Step (11) is implemented in the following manner 1, manner 2, or manner 3.

Manner 1: Determine the blocked region based on a touched region on the screen of the device.

Figure 5:
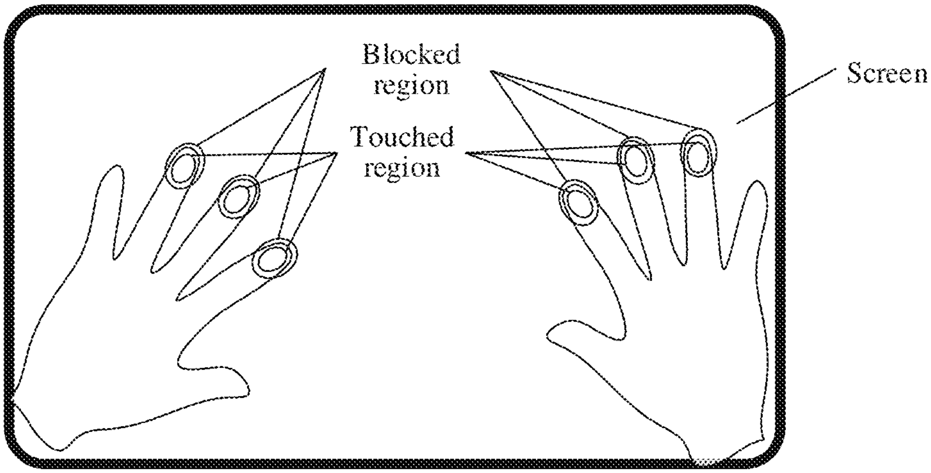
FIG. 5 is a schematic diagram of a touched region and a blocked region according to at least one embodiment.

Manner 1 is a contact (that is, contact between an obstacle and a screen is required) manner of obtaining the blocked region on the screen of the device. During specific implementation of Manner 1, the touched region on the screen of the device is determined to be the blocked region, or a region including the touched region on the screen of the device is determined to be the touched region. For example, considering that a finger pulp of a person has a specific radian, in response to the finger pulp touching the screen of the device, another part (for example, a fingernail) of a finger is also close to the screen, and blocks an antenna-under-display. Therefore, a region obtained by extending a part of region outwards based on the touched region on the screen of the device is used as the blocked region. For example, refer to FIG. 5. An edge of a touched region on a screen of a device is extended outwards by a specific width, for example, by 3 millimeters (mm), the extended region is used as the blocked region. A specific extension manner is implemented by using an algorithm.

Manner 1 is implemented in a mechanical manner, an electromagnetic manner, or an optical manner. The following provides descriptions separately by using Manner 1.1 (Manner 1 is implemented in the mechanical manner) and Manner 1.2 (Manner 1 is implemented in the electromagnetic manner or an optical manner).

Manner 1.1: Manner 1 is implemented in the mechanical manner.

In at least one embodiment of Manner 1.1, capacitance change information of a region on the screen of the device is obtained, and a region in which capacitance changes is determined as the touched region. In this case, an alternative description of Manner 1 is: obtain capacitance change information of a region on the screen of the device, and determine the blocked region based on a region in which capacitance changes. Specifically, the capacitance change information of the region on the screen of the device is obtained, the region in which the capacitance changes is determined as the touched region on the screen of the device, and the blocked region is determined based on the touched region.

Figure 6:
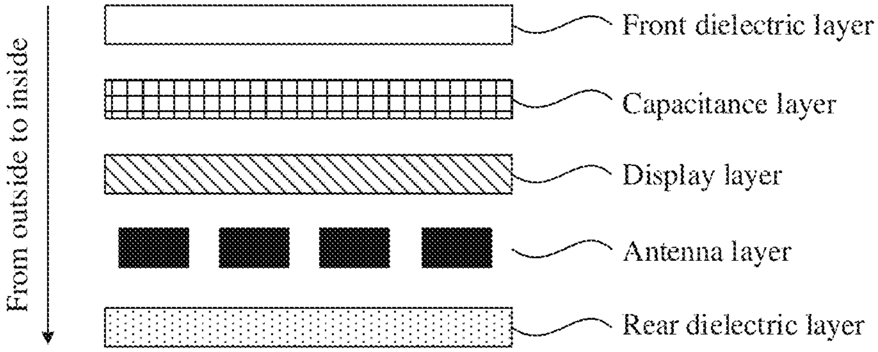
FIG. 6 is a schematic diagram of a structure of a device according to at least one embodiment.

For example, refer to FIG. 6. A screen of a device includes a front dielectric layer, a capacitance layer, a display layer, an antenna layer, and a rear dielectric layer from the outside (a screen surface of the device) to the inside. The front dielectric layer is, for example, glass or resin. The capacitance layer integrates a layer of capacitance material, for example, an ultrasonic thin film sensing material, which is specifically an ultrasonic thin film sensor (for example, a thin film transistor (thin film transistor, TFT)). The display layer is, for example, an organic light-emitting diode (organic light-emitting diode, OLED) or a liquid crystal display (liquid crystal display, LCD). The antenna layer includes an antenna, a radio frequency (radio frequency, RF), a printed circuit board (printed circuit board, PCB), and the like. The rear dielectric layer is, for example, metal. Antennas are discretely distributed on a plane where the antenna layer is located. In response to a user touching the screen, pressure of the screen is changed, causing a change of a capacitance feature of the capacitance layer. Which regions on the screen are touched is determined based on the feature. In this method, a feature of the screen of the device is fully utilized to conveniently and quickly determine which regions on the screen are blocked.

In at least one embodiment of Manner 1.1, a pressure sensor is disposed under the screen of the device. In this case, pressure change information of a region on the screen of the device is obtained, and a region in which pressure changes is determined as the touched region. In this case, an alternative description of Manner 1 is: obtain pressure change information of a region on the screen of the device, and determine the blocked region based on a region in which pressure changes. Specifically, the pressure change information of the region on the screen of the device is obtained, the region in which the pressure changes is determined as the touched region on the screen of the device, and the blocked region is determined based on the touched region.

Manner 1.2: Manner 1 is implemented in the electromagnetic manner or the optical manner.

In Manner 1.2, the touched region on the screen of the device is determined by using one or more sensors. In this case, an alternative description of Manner 1 is: perform blocking detection on the screen of the device by using one or more sensors, to obtain a detection result; and determine the blocked region based on the detection result. Specifically, the touched region on the screen of the device is determined by using the one or more sensors, and the blocked region is determined based on the touched region.

Figure 7:
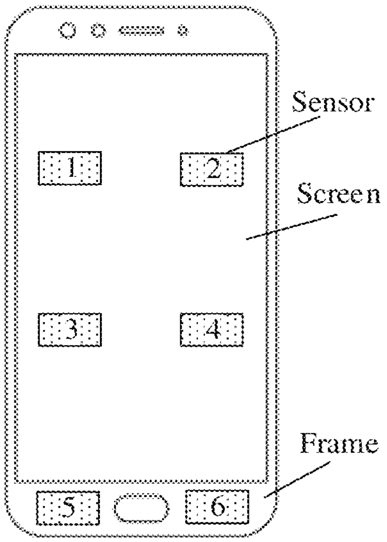
FIG. 7 is a schematic diagram of positions of sensors on a device according to at least one embodiment.

The sensor (for example, sensors 1 to 4 in FIG. 7) is located below the screen of the device, or the sensor (for example, a sensor 5 and a sensor 6 in FIG. 7) is located below a frame of the device. The sensor is an electromagnetic sensor (for example, a distance sensor), an optical sensor (for example, an infrared detector, a femtosecond laser (time of flight, ToF)), or the like.

In Manner 1.2, the sensor detects the blocked region in an active manner, or detects the blocked region in a passive manner. The active manner refers to a manner in which the sensor sends a signal (for example, an electromagnetic signal or an optical signal (such as non-visible light)), and then performs detection. The passive manner refers to a manner in which the sensor does not send a signal and directly performs detection.

Figure 8:
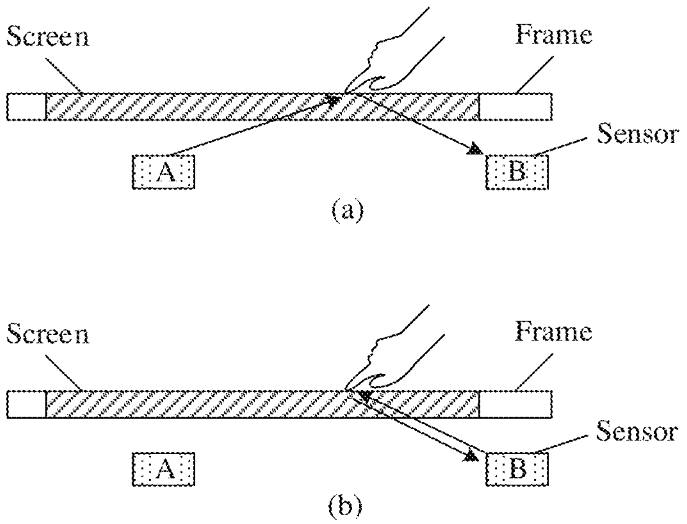
FIG. 8 is a schematic diagram of signal receiving and sending of sensors according to at least one embodiment.

In response to detection being performed in the active manner, there are two signal detection methods. In a first method, refer to (a) in FIG. 8. A sensor (for example, a sensor A) sends a signal, and another sensor (for example, a sensor B) receives a signal reflected by an obstacle. In another implementation method, refer to (b) in FIG. 8. A sensor (for example, the sensor B) sends a signal, and then receives the signal reflected by the obstacle. For the electromagnetic sensor, the signal is an electromagnetic signal. For the optical sensor, the signal is an optical signal. At least two sensors are used in the first method.

An implementation of determining, by performing signal detection, the touched region on the screen of the device is any one of the following implementations.

Implementation 1: Which regions on the screen of the device are touched is determined based on strength of the signal reflected by the obstacle.

A longer signal transmission distance indicates greater signal attenuation. Therefore, the strength of the signal reflected by the obstacle represents a signal transmission distance, and which regions on the screen of the device are touched is determined based on the strength of the signal reflected by the obstacle.

For example, for a position (for example, a position A) on the screen, in response to the user touches the position A, and a transmitted signal of the sensor A is attenuated by 3 decibels (decibels, dBs) compared with a received signal of the sensor B, in response to strength of the transmitted signal of the sensor A is 8 dB, and strength of the received signal of the sensor B is 3 dB, the signal is attenuated by 5 dB. In this case, the position A is not considered touched. In response to the user touching the position A, a value of attenuation obtained by comparing the transmitted signal of the sensor A with the received signal of the sensor B is obtained through testing in response to the user touching the position A, or being obtained through calculation based on a value of signal attenuation at another position (for example, the position B) and a geometric relationship between the position B and the position A. This is not limited in at least one embodiment.

Implementation 2: A phase difference between a transmitted signal and a received signal is detected by using a sensor, and a time difference between a signal sending moment and a signal receiving moment is obtained through calculation based on the phase difference between the transmitted signal and the received signal, to determine a signal transmission distance, and to determine, based on the distance, which regions on the screen of the device are touched.

The phase difference $\Delta\eta=2*\pi*c*\Delta t/\lambda$, where c refers to a speed of light, $\Delta t$ refers to the time difference between the signal sending moment and the signal receiving moment, $\lambda$ refers to a wavelength, and "*" refers to "multiplied by". In this case, $\Delta t$ is obtained through calculation based on $\Delta\eta$, where $\Delta t*c$ is the signal transmission distance.

Figure 9:
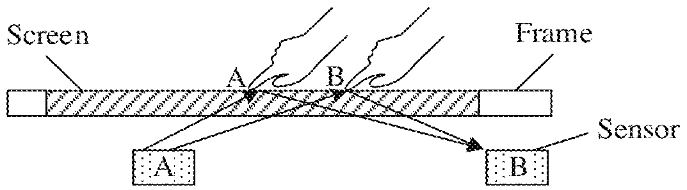
FIG. 9 is another schematic diagram of signal receiving and sending of sensors according to at least one embodiment.

In response to different positions on the screen of the device being touched, signal transmission distances are different. Therefore, which regions on the screen of the device are touched is determined based on the signal transmission distance. For example, refer to FIG. 9. In response to a user touching a position A, and an actual signal transmission distance is 20 mm, in response to a transmission distance being obtained through calculation based on $\Delta\eta$ and being detected by a sensor is 22 mm, the position A is not touched. In response to the user touching the position A, the actual signal transmission distance is obtained through testing in response to the user touching the position A, or being obtained through calculation based on an actual signal transmission distance at another position (for example, a position B) and a geometric relationship between the position B and the position A. This is not limited in at least one embodiment.

A method for determining the signal transmission distance based on Implementation 2 has high accuracy.

Implementation 3: A time difference between a signal sending moment and a signal receiving moment is detected by using a sensor, to determine a signal transmission distance, and to determine, based on the distance, which regions on the screen of the device are touched.

The sensor configured to detect the time difference is a ToF. For an implementation process after the time difference is determined, refer to Implementation 2. Details are not described again.

In response to the blocked region being detected in the passive manner, in response to an optical signal being received by the optical sensor from a position is interrupted, the position is determined to be blocked. The optical signal is one or more frequency components of natural light, for example, infrared light, near ultraviolet light, or a visible optical signal.

Manner 2: Determine the blocked region on the screen of the device based on a position of an obstacle, in a first space, that blocks the screen of the device, where projection of a bottom surface of the first space on a horizontal plane is a screen surface of the device, and a height is a preset value (marked as a first preset value).

Figure 10:
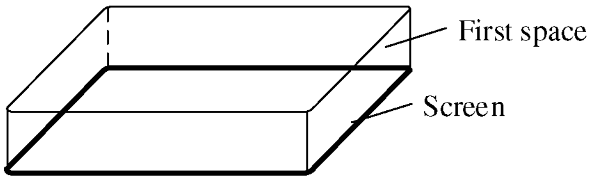
FIG. 10 is a schematic diagram of a first space according to at least one embodiment.
Figure 10:
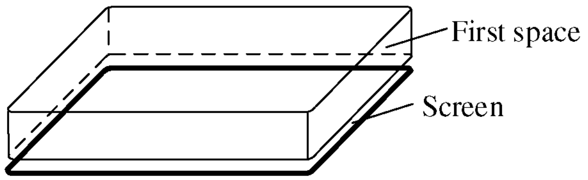

In one case, refer to (a) in FIG. 10. A bottom surface of a first space is a screen surface of a device. In another case, refer to (b) in FIG. 10. The bottom surface of the first space is a plane whose distance from the screen surface of the device is a second preset value.

The first preset value and/or the second preset value is preset. For example, the first preset value is 30 mm, and the second preset value is 1 mm. The first preset value and/or the second preset value alternatively relates to one or more of a size of the device, a size of the screen of the device, a transmit power of a communication module of the device, a receive power of the communication module of the device, a communication service type carried by a signal transmitted by using the first antenna set, a frequency for touching the screen for performing a service by the device in a communication process, and a detection capability of the device for the antenna-under-display blocking information. For example, in response to the size of the device being larger, the first preset value and/or the second preset value is larger, where the first preset value is less than the size of the device. In response to the screen size of the device being larger, the first preset value and/or the second preset value is larger, where the first preset value is less than the screen size of the device. In response to the transmit power of the communication module of the device being larger, the first preset value and/or the second preset value is smaller. In response to the receive power of the communication module of the device being larger, the first preset value and/or the second preset value is smaller. In response to a power corresponding to the communication service type carried by the signal transmitted by using the first antenna set being lower, the first preset value and/or the second preset value is larger (for example, the first preset value and/or the second preset value is larger in wireless fidelity (wireless fidelity, Wi-Fi) communication and near field communications than in cellular communication). A higher frequency for touching the screen for performing the service by the device in the communication process indicates a smaller first preset value and/or a smaller second preset value. For example, a first preset value and/or a second preset value corresponding to a real-time interaction service is lower than a first preset value and/or a second preset value corresponding to a service that is operated only by touching a button. A weaker detection capability of the device for the antenna-under-display blocking information, for example, a weaker processing capability of a sensor or a detection module that performs detection, indicates a smaller first preset value and/or a smaller second preset value.

Manner 2 is a non-contact (that is, contact between the obstacle and the screen is not required) manner of obtaining the blocked region on the screen of the device.

In response to Manner 2 being implemented in the electromagnetic manner or the optical manner, an alternative description of Manner 2 is: perform blocking detection on a first space by using one or more sensors; and determine the blocked region based on a region formed by projecting a position of an obstacle that blocks the screen of the device and that is in the first space onto the screen. Specifically, the region formed by projecting the position of the obstacle that blocks the screen of the device and that is in the first space onto the screen is determined as the blocked region. Alternatively, a region obtained by extending a part of region outwards based on the region formed by projecting the position of the obstacle that blocks the screen of the device and that is in the first space onto the screen is determined as the blocked region. A specific implementation is similar to that in Manner 1, and is understood with reference to that in Manner 1, and details are not described herein again.

For descriptions of the sensor and a detection principle of the sensor, refer to the foregoing descriptions. Details are not described again. A difference lies in that in Manner 1, the sensor is configured to detect which regions on the screen of the device are touched, and the sensor herein is configured to detect the position of the obstacle in the first space.

In Manner 2, in response to strength of a received signal of the sensor being used to determine whether an antenna-under-display in a blocked region is blocked, strength of a signal (that is, the received signal of the sensor) reflected by an obstacle that blocks the region is marked as $\alpha$. In response to $\alpha > Thr1$, the antenna-under-display is considered to be blocked. In response to $Thr2 < \alpha \leq Thr1$, because the obstacle is far away from the screen of the device, in some cases (for example, in response to a communication quality requirement is high or a transmit power of the device is low), the antenna-under-display is considered to be blocked. Both Thr1 and Thr2 herein are thresholds of the strength of the signal. In response to a signal transmission distance being used to determine whether an antenna-under-display in a blocked region is blocked, the signal transmission distance is marked as $\beta$. In response to $\beta < Thr3$, the antenna-under-display is considered to be blocked. In response to $Thr3 \leq \beta < Thr4$, because the obstacle is far away from the screen of the device, in some cases (for example, in response to the communication quality requirement being high or the transmit power of the device being low), the antenna-under-display is considered to be blocked. Both Thr3 and Thr4 herein are thresholds of the signal transmission distance. In this part, a decision result of whether the antenna-under-display is blocked is not absolutely being blocked or being unblocked. Such a decision is referred to as a soft decision.

In at least one embodiment, a decision result of whether the antenna-under-display is blocked is either being blocked or being unblocked. Such a decision is referred to as a hard decision.

Figure 11:
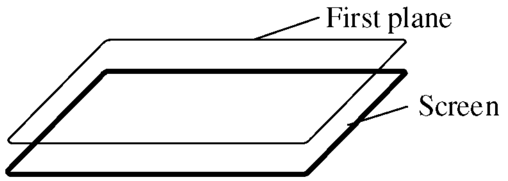
FIG. 11 is a schematic diagram of a first plane according to at least one embodiment.

Manner 3: Determine the blocked region based on a touched region of a first plane, where projection of the first plane on a horizontal plane is a screen surface of the device, and a height of the first plane relative to the screen of the device is a third preset value (for details, refer to FIG. 11 for understanding).

A process of determining the blocked region in Manner 3 is similar to a process of determining the blocked region in Manner 1, and the screen of the device in Manner 1 is used as the first plane for understanding. A difference lies in that the obstacle cannot generate pressure on the screen in response to touching the first plane, therefore, Manner 1.1 in Manner 1 cannot be used to determine the blocked region herein.

Figure 12:
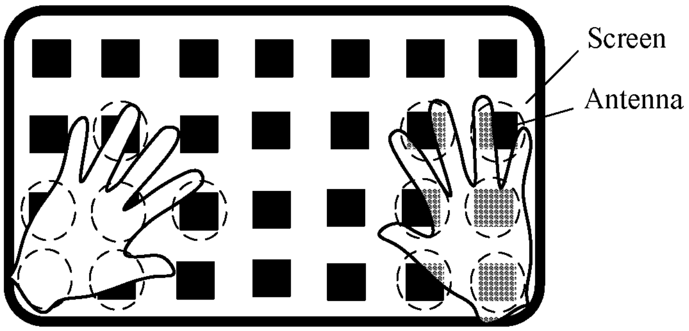
FIG. 12 is a schematic diagram of blocked antennas according to at least one embodiment.
Figure 13:
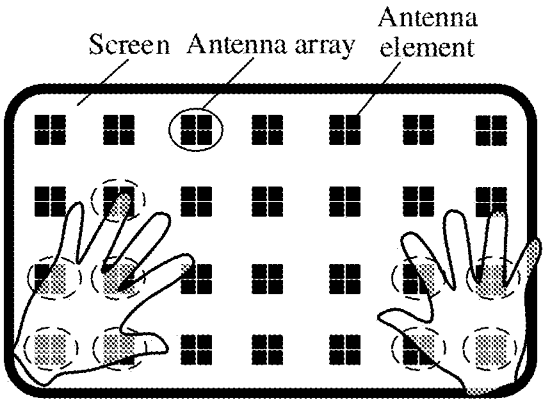
FIG. 13 is another schematic diagram of blocked antennas according to at least one embodiment.

Step (12) includes two manners of determining the blocked antenna-under-display. One manner is directly determining that an antenna-under-display in the blocked region on the screen of the device is the blocked antenna-under-display. For example, refer to FIG. 12. In FIG. 12, an antenna is an antenna element or is an antenna array. In this case, antennas circled by dashed lines in FIG. 12 is determined as unblocked antenna-under-displays. The other manner is, in response to an antenna-under-display being an antenna-under-display array, and a ratio of a quantity of antenna elements in the blocked region on the screen of the device to a quantity of antenna elements in an antenna array to which the antenna elements in the blocked region on the screen of the device belongs being greater than a first threshold, determining that the antenna-under-display in the blocked region on the screen of the device is a blocked antenna-under-display. For example, refer to FIG. 13. In FIG. 13, an antenna is antenna arrays, and each antenna array includes four antenna elements. In response to the first threshold being 0.5, antennas circled by dashed lines in FIG. 13 are determined as blocked antenna-under-displays.

During specific implementation of step 401, region division is performed on the screen of the device (marked as Case 1), space division is performed on the first space (marked as Case 2), or region division is performed on the first plane (marked as Case 3), and the blocked antenna-under-display is determined based on a divided region or space. The following describes, by using examples, the method provided in at least one embodiment in Case 1, Case 2, and Case 3.

Case 1: Region division is performed on the screen of the device.

In Case 1, the screen of the device includes a plurality of first regions, where there is a correspondence between a first region and an antenna-under-display. For example, refer to FIG. 14. A screen of a device is divided into 45 first regions numbered 1, 2, 3, . . . , and 45 respectively. 12 antenna-under-displays are numbered a, b, c, . . . , and 1 respectively. A correspondence between an antenna-under-display and a first region is established. For example, for the correspondence between the antenna-under-display and the first region in FIG. 14, refer to Table 1.

TABLE 1

| First region | Antenna |
|---|---|
| 6 | a |
| 8 | b |

TABLE 1-continued

| First region | Antenna |
|---|---|
| 10 | c |
| 16 | d |
| 18 | e |
| 20 | f |
| 26 | g |
| 28 | h |
| 30 | 1 |
| 36 | j |
| 38 | k |
| 40 | 1 |

Figure 14:
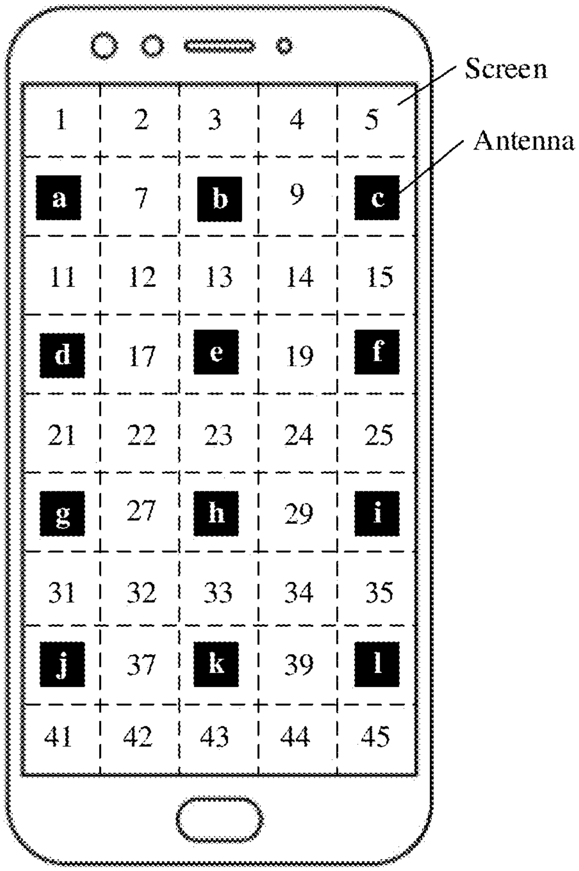
FIG. 14 is a schematic diagram of a correspondence between an antenna and a first region according to at least one embodiment.

In FIG. 14, an example in which one first region corresponds to one antenna-under-display is used for drawing. Actually, one first region corresponds to a plurality of antenna-under-displays, or a plurality of first regions corresponds to one antenna-under-display.

In Case 1, during specific implementation, step 401 includes: in response to a blocked proportion of a first region corresponding to a first antenna-under-display being greater than a second threshold, the first antenna-under-display is determined to be blocked; and in response to the blocked proportion of the first region corresponding to the first antenna-under-display being less than the second threshold, the first antenna-under-display is determined to not be blocked. The first antenna-under-display is one of the antenna-under-displays of the device. In response to the blocked proportion of the first region corresponding to the first antenna-under-display being equal to the second threshold, the first antenna-under-display is determined to be blocked, or the first antenna-under-display is determined to not be blocked.

In this case, in response to a blocked proportion or blocked proportions of one or some first regions being greater than the second threshold, antennas in the one or some first regions are blocked. For example, based on the example shown in Table 1, in response to a blocked proportion of the first region 6 being greater than the second threshold, the antenna a is determined to be blocked. In response to blocked proportions of the first region 6 and the first region 10 being greater than the second threshold, the antenna a and the antenna c are determined to be blocked.

In Case 1, a blocked region of the first region corresponding to the first antenna-under-display is detected in the mechanical manner, the electromagnetic manner, or the optical manner in the foregoing Manner 1. For details, refer to the foregoing descriptions. Details are not described again. In response to detection being performed in the electromagnetic manner or the optical manner, one or more sensors is disposed in each first region to detect whether an antenna-under-display in the first region is blocked. Alternatively, one or more sensors is disposed in a plurality of first regions to detect whether antenna-under-displays in the plurality of first regions are blocked. This is not limited in at least one embodiment.

Case 2: Space division is performed on the first space.

Figure 15:
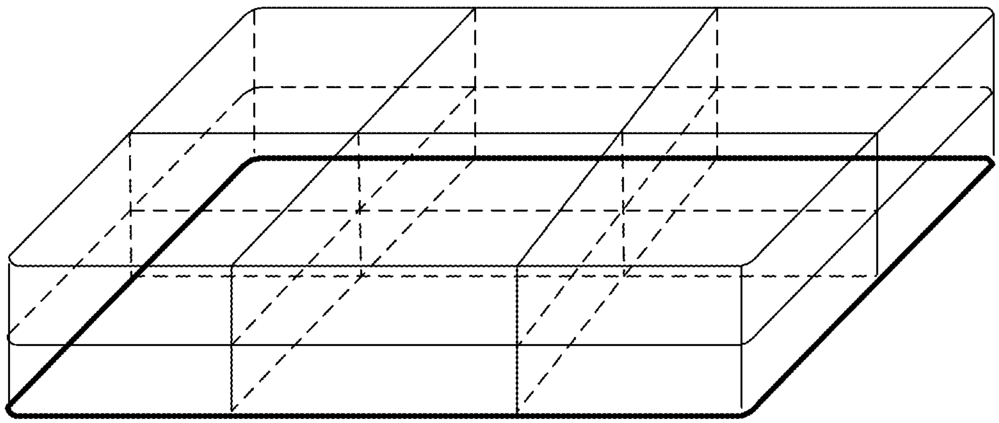
FIG. 15 is a schematic diagram of subspaces included in a first space according to at least one embodiment.

In Case 2, the first space includes M*N subspaces, M is an integer greater than 1, N is an integer greater than 0, a bottom surface of the first space includes M second regions, there is a correspondence (similar to the correspondence between the first region and the antenna-under-display in Case 1, and reference is made for understanding) between a second region and an antenna-under-display. A space that uses the second region as a bottom surface and whose height is the preset value includes N subspaces, and heights of the N subspaces corresponding to a same second region is the same or is different. This is not limited in at least one embodiment. For example, the bottom surface of the first space is the screen of the device. Refer to FIG. 15. In response to the first preset value being 20 mm, M is 6, and N is 2, the screen of the device is divided into six second regions, where each space that uses the second region as a bottom surface and whose height is 20 mm includes two subspaces. In this case, the first space includes 12 subspaces, and there is a correspondence (not shown in FIG. 15) between an antenna-under-display and a second region.

In Case 2, in a first implementation, during specific implementation, step 401 may include:

- in response to a ratio of an area formed by projecting an obstacle that blocks the screen of the device and that is in a first subspace onto the screen to an area of a second region corresponding to a first antenna-under-display being greater than a third threshold, the first antenna-under-display is determined to be blocked; and
- in response to the ratio of the area formed by projecting the obstacle that blocks the screen of the device and that is in the first subspace onto the screen to the area of the second region corresponding to the first antenna-under-display being less than the third threshold, the first antenna-under-display is determined to not be blocked.

The first subspace is a subspace, closest to the screen of the device among subspaces occupied by the obstacle, in the N subspaces corresponding to the second region corresponding to the first antenna-under-display. The first antenna-under-display is one of the antenna-under-displays of the device, and the third threshold corresponds to the first subspace. In response to the ratio of the area formed by projecting the obstacle that blocks the screen of the device and that is in the first subspace onto the screen to the area of the second region corresponding to the first antenna-under-display being equal to the third threshold, the first antenna-under-display is determined to be blocked, or the first antenna-under-display is determined to not be blocked.

There is a plurality of subspaces that are of the N subspaces of the second region corresponding to the first antenna-under-display and that are occupied by the obstacle. An obstacle in a subspace (that is, the first subspace) closest to the screen of the device blocks the screen most severely. Therefore, whether the ratio of the area formed by projecting the obstacle that blocks the screen of the device and that is in the first subspace onto the screen to the area of the second region corresponding to the first antenna-under-display is greater than the third threshold is to be determined. After whether the ratio of the area formed by projecting the obstacle that blocks the screen of the device and that is in the first subspace onto the screen to the area of the second region corresponding to the first antenna-under-display is greater than the third threshold are determined, whether the first antenna-under-display is blocked is determined. A process is similar to that in Case 1, and is understood with reference to that in Case 1. Details are not described again. In this case, one or more sensors is disposed on a region formed by projecting each second region onto the screen, to detect whether an antenna-under-display corresponding to the second region is blocked. Alternatively, one or more sensors is disposed on regions formed by projecting a plurality of second regions onto the screen, to detect whether antenna-under-displays corresponding to the plurality of second regions are blocked. This is not limited in at least one embodiment.

The area formed by projecting the obstacle that blocks the screen of the device and that is in the first subspace onto the screen is detected by using a sensor. For a detection principle, refer to the foregoing Manner 2, and details are not described again.

The first subspace corresponds to the third threshold, and another subspace corresponds to another threshold. A process of determining whether an antenna-under-display corresponding to the another subspace is blocked is similar to a process of determining whether an antenna-under-display corresponding to the first subspace is blocked, and details are not described again. Thresholds corresponding to different subspaces is the same or different. This is not limited in at least one embodiment. In at least one embodiment, thresholds corresponding to a layer of subspaces that have a same distance from the screen of the device is the same, and thresholds corresponding to subspaces that have different distances from the screen of the device is different. A longer distance from the screen of the device indicates a less impact on an antenna-under-display. Therefore, a threshold corresponding to a subspace that is farther away from the screen of the device is larger.

In Case 2, in a second implementation, N=1, and during specific implementation, step 401 includes:

in response to strength of a signal that is received by a sensor configured to detect whether an antenna-under-display corresponding to the second region (assumed to be a second region 1) is blocked, and that is reflected by an obstacle that passes through a first subspace corresponding to the second region 1 and that blocks the screen of the device being greater than a fourth threshold, the antenna-under-display corresponding to the second region 1 is determined to be blocked; and in response to the strength of the signal that is received by the sensor configured to detect whether the antenna-under-display corresponding to the second region 1 is blocked, and that is reflected by the obstacle that passes through the first subspace corresponding to the second region 1 and that blocks the screen of the device being greater than a fifth threshold and being less than or equal to the fourth threshold, in response to a communication quality requirement being high or a transmit power of the device being low), the antenna-under-display corresponding to the second region 1 is determined to be blocked. In other words, in response to the communication quality requirement being high or the transmit power of the device being low, the antenna-under-display corresponding to the second region 1 is not used for signal transmission, to avoid reducing communication quality or increasing the transmit power of the device because of the blocked antenna-under-display.

The strength of the signal that is received by the sensor configured to detect whether the antenna-under-display corresponding to the second region 1 is blocked, and that is reflected by the obstacle that passes through the first subspace corresponding to the second region 1 and that blocks the screen of the device is marked as $\alpha$, the fourth threshold is marked as Thr1, and the fifth threshold is marked as Thr2. In other words, in response to $\alpha > \text{Thr1}$, because the obstacle is close to the screen of the device, the antenna-under-display corresponding to the second region 1 is considered to be blocked. In response to $\text{Thr2} < \alpha \leq \text{Thr1}$, because the obstacle is far away from the screen of the device, in some cases, the antenna-under-display corresponding to the second region 1 is considered to be blocked. In this part, a decision result of whether the antenna-under-display is blocked is not absolutely being blocked or being unblocked. Such a decision is referred to as a soft decision. In at least one embodiment, a decision result of whether the antenna-under-display is blocked is either being blocked or being unblocked. Such a decision is referred to as a hard decision.

In Case 2, in a third implementation, N=1, and during specific implementation, step 401 may include:

in response to a signal transmission distance determined based on a detection result of a sensor (marked as a first sensor) configured to detect whether an antenna-under-display corresponding to the second region (assumed as a second region 2) is blocked being less than a sixth threshold, the antenna-under-display corresponding to the second region 2 is determined to be blocked; and in response to the signal transmission distance determined based on the detection result of the first sensor being greater than or equal to the sixth threshold and less than a seventh threshold, in response to the communication quality requirement being relatively high or the transmit power of the device is relatively low, the antenna-under-display corresponding to the second region 2 is determined to be blocked. In other words, in response to the communication quality requirement being high or the transmit power of the device being low, the antenna-under-display corresponding to the second region 2 is not used for signal transmission, to avoid reducing communication quality or increasing the transmit power of the device because of the blocked antenna-under-display.

The signal transmission distance determined based on the detection result of the first sensor is marked as $\beta$, the sixth threshold is marked as Thr3, and the seventh threshold is marked as Thr4. To be specific, in response to $\beta < \text{Thr3}$, the antenna-under-display is considered blocked. In response to $\text{Thr3} \leq \beta < \text{Thr4}$, because the obstacle is far away from the screen of the device, in some cases (for example, in response to the communication quality requirement is high or the transmit power of the device is low), the antenna-under-display is considered blocked. In this part, a decision result of whether the antenna-under-display is blocked is not absolutely being blocked or being unblocked. Such a decision is referred to as a soft decision. In at least one embodiment, a decision result of whether the antenna-under-display is blocked is either being blocked or being unblocked. Such a decision is referred to as a hard decision.

In the foregoing embodiment, in one case, $\text{Thr2} < \alpha \leq \text{Thr1}$ alternatively is replaced with $\text{Thr2} \leq \alpha \leq \text{Thr1}$. In another case, $\alpha > \text{Thr1}$ is replaced with $\alpha \geq \text{Thr1}$, and in this case, $\text{Thr2} < \alpha \leq \text{Thr1}$ is alternatively replaced with $\text{Thr2} \leq \alpha < \text{Thr1}$ or $\text{Thr2} < \alpha < \text{Thr1}$. Similarly, in one case, $\text{Thr3} \leq \beta < \text{Thr4}$ is replaced with $\text{Thr3} \leq \beta \leq \text{Thr4}$. In another case, $\beta < \text{Thr3}$ is replaced with $\beta \leq \text{Thr3}$, and in this case, $\text{Thr3} \leq \beta < \text{Thr4}$ is replaced with $\text{Thr3} < \beta \leq \text{Thr4}$ or $\text{Thr3} < \beta < \text{Thr4}$.

In the foregoing embodiment, the first threshold, the second threshold, the third threshold, the fourth threshold, the fifth threshold, the sixth threshold, and the seventh threshold are all preset.

Case 3: Region division is performed on the first plane.

In Case 3, the first plane includes a plurality of third regions, where there is a correspondence (similar to the correspondence between the first region and the antenna-under-display in Case 1, and reference is made for understanding) between a third region and an antenna-under-display. For descriptions of the first plane, refer to the foregoing descriptions, and details are not described again. A process of determining a blocked antenna-under-display in Case 3 is similar to that in Case 1, and the screen of the device in Case 1 is replaced with the first plane for understanding. For the process of determining the blocked region in Case 3, refer to related descriptions in Manner 3, and details are not described again.

In the foregoing Manner 2, Manner 3, Case 2, and Case 3, the obstacle is able to not touch the screen of the device. Therefore, whether the screen is blocked by an obstacle that is untouched but suspended at a short distance is determined, for example, a palm part or an arm part. Which antenna-under-displays are blocked is determined more accurately.

Optionally, during specific implementation, step 402 includes: determining the second antenna set based on the antenna-under-display blocking information; and determining the first antenna set from the second antenna set.

In response to the first antenna set being determined, a quantity of antennas in the first antenna set is determined based on a transmission mode. For example, in response to the transmission mode being the SISO, one antenna is selected from the second antenna set as the first antenna set. In response to the transmission mode being 4*4 (4 before "*" indicates a quantity of transmit antennas, and 4 after "*" indicates a quantity of receive antennas) MIMO, four antennas are selected from the second antenna set as the first antenna set. In response to the transmission mode being the beamforming, antennas of a corresponding quantity are selected from the second antenna set as the first antenna set based on a quantity of antennas used by the beamforming. For ease of signal transmission, the antennas in the first antenna set are antennas having a same polarization direction.

In response to a quantity of antennas in the second antenna set being less than a quantity of antennas used by the transmission mode, current communication is ended, or the current communication is continued but a quantity of used antennas is reduced. For example, in response to the transmission mode being 4*4 MIMO, but the quantity of antennas in the second antenna set is 2, the transmission mode is switched to 2*2 MIMO.

Optionally, the method further includes: detecting the antenna-under-display blocking information of the device periodically or under some triggering conditions (for example, in response to there being a communication requirement, and link quality of a communication link does not meet the requirement); and updating the second antenna set based on the detected antenna-under-display blocking information of the device. Hand movements of the user change continuously in a process in which the user operates the device. Therefore, blocking of the antenna-under-display also keeps changing. In this optional method, the second antenna set is updated. A selected first antenna set is determined based on a latest second antenna set, to ensure communication quality.

After the second antenna set is updated, whether to update the first antenna set is determined, and in response to being determined to update the first antenna set, the first antenna set is further updated. For example, in response to being determined that the quantity of antennas in the second antenna set increases, more antennas are used for communication (for example, an antenna gain of the beamforming is greater, and a specification of the MIMO is higher). In this case, the first antenna set is updated.

Optionally, after the first antenna set is determined based on the antenna-under-display blocking information, the foregoing method further includes: determining whether link quality of a communication link of the device meets a requirement, and in response to the link quality not meeting the requirement, updating the first antenna set; or receiving indication information, where the indication information indicates to update the first antenna set, or indicates to update the first antenna set in response to the link quality of the communication link not meeting the requirement. In this optional method, the first antenna set is updated based on the link quality of the communication link, so that a currently used first antenna set meets the link quality requirement of the communication link.

A network device sends the indication information to the device in response to the link quality of the communication link of the device not meeting the requirement. For example, in response to the network device discovers that current quality of service (quality of service, QoS) of the communication link being lower than QoS required by the communication link, in response to the network device discovering that retransmission occurs on the communication link for a plurality of times, or in response to the network device discovering that a block error rate (block error rate, BLER) of the communication link cannot meet a system requirement, the link quality of the communication link is considered to not meet the requirement.

In a complete communication process (for example, a game running process), user operation behaviors change in different time periods. As a result, an antenna-under-display blocking situation also changes accordingly. In this case, the following solution 1 or solution 2 is used to implement the foregoing method.

Solution 1

In Solution 1, after the first antenna set is determined, in response to the link quality of the communication link not meeting the requirement, updating of the first antenna set (or the second antenna set) is triggered.

Figure 16:
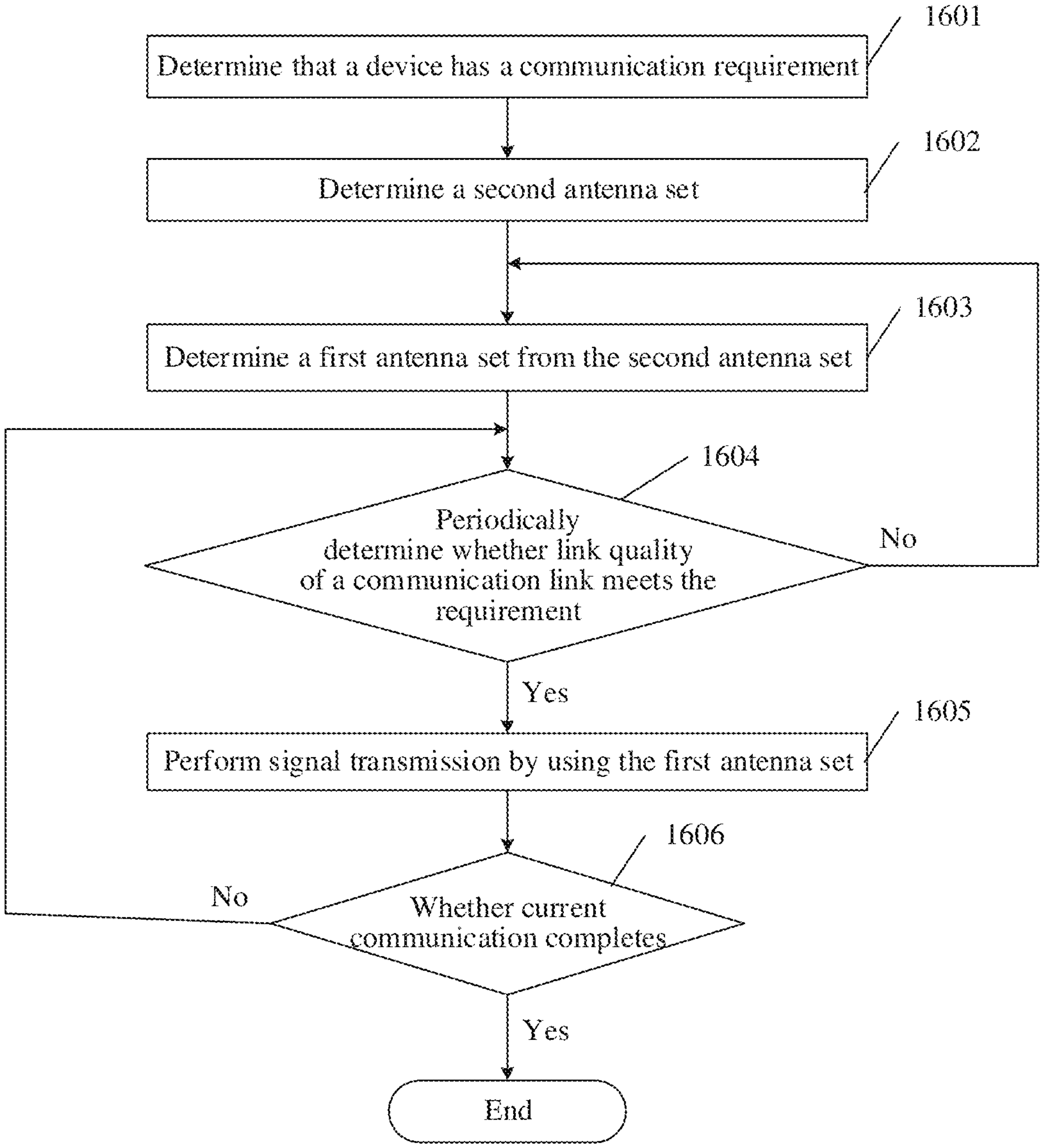
FIG. 16 is a flowchart of another antenna-under-display management method according to at least one embodiment.

Refer to FIG. 16. During specific implementation, Solution 1 includes the following steps.

1601. Determine that a device has a communication requirement.

1602. Determine a second antenna set.

1603. Determine a first antenna set from the second antenna set.

1604. Periodically determine whether link quality of a communication link meets the requirement.

In response to the link quality of the communication link meeting the requirement, perform steps 1605 and 1606. In response to the link quality of the communication link not meeting the requirement, return to step 1602 or step 1603 (an example of returning to step 1603 is used for illustration in FIG. 16).

1605. Perform signal transmission by using the first antenna set.

1606. Determine whether current communication completes.

In response to the current communication completing, a process ends. In response to the current communication not completing, return to step 1604.

Solution 2

In Solution 2, after the first antenna set is determined, in response to the link quality of the communication link not meeting the requirement, updating of the first antenna set (or the second antenna set) is triggered, and the second antenna set is periodically updated.

Figure 17:
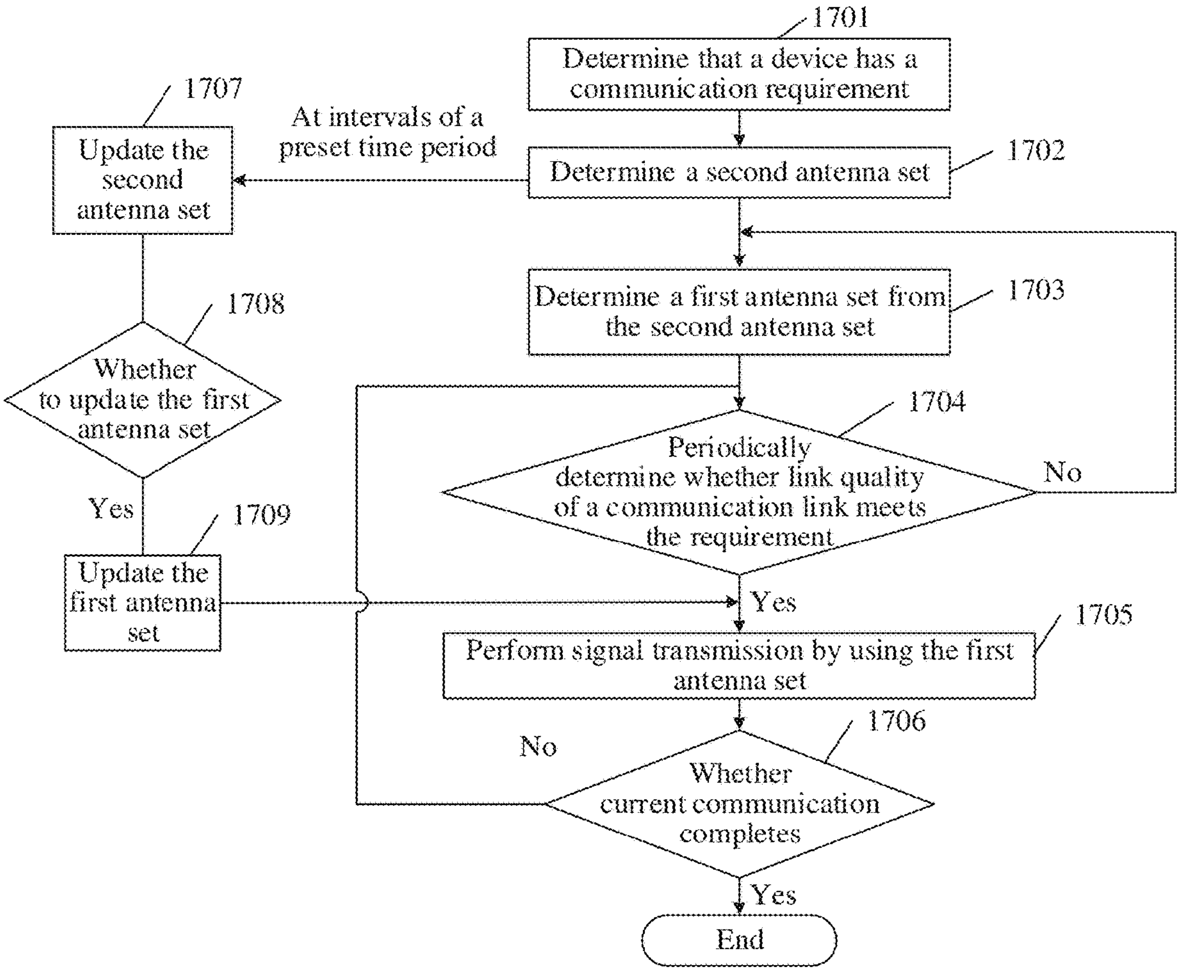
FIG. 17 is a flowchart of another antenna-under-display management method according to at least one embodiment.

Refer to FIG. 17. During specific implementation, Solution 2 includes the following steps.

Steps 1701 to 1706 are the same as steps 1601 to 1606 respectively.

1707. Update a second antenna set at intervals of a preset time period (that is, periodically update the second antenna set).

1708. Determine whether to update a first antenna set.

In response to being determined to update the first antenna set, perform action 1709. In response to determining not to update the first antenna set, no action is performed.

1709. Update the first antenna set.

After step 1709 is performed, action 1705 is performed.

Figure 18:
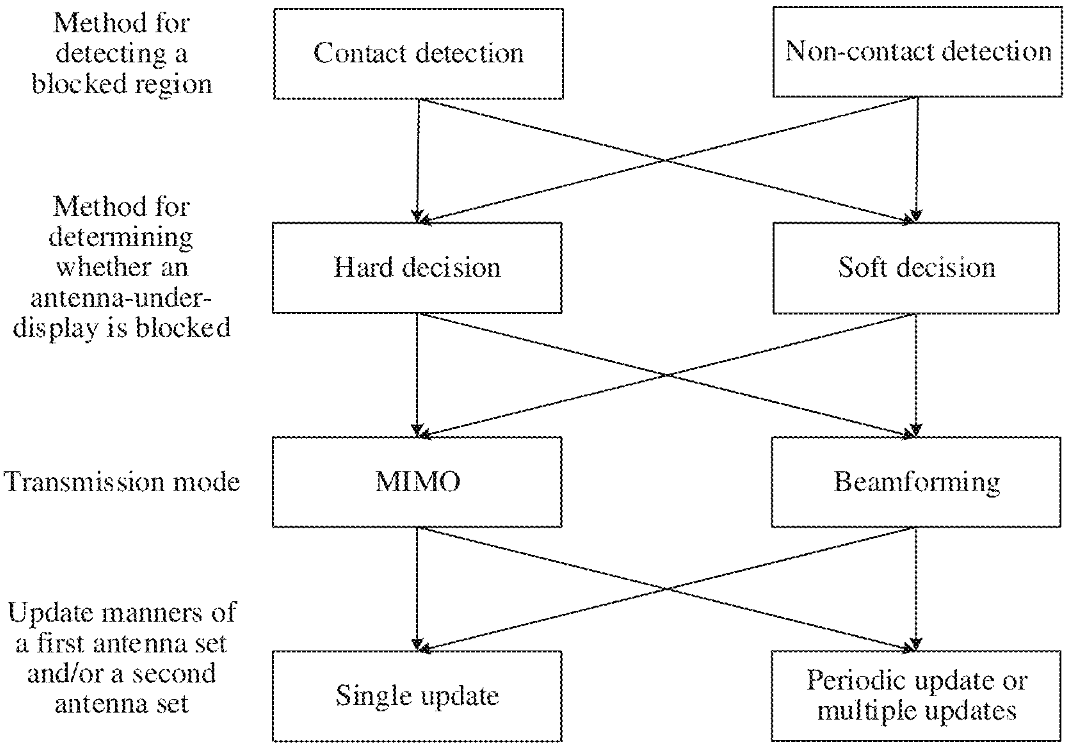
FIG. 18 is a schematic diagram of a combination of different implementations according to at least one embodiment.

During specific implementation of the method provided in the foregoing embodiments, solutions is combined. For example, refer to FIG. 18. All solutions connected together by using arrows is combined.

In at least one embodiment, in addition to determining a blocked region by using a capacitance layer on a screen of a device, the foregoing sensor, and the like, the blocked region is alternatively determined by positioning an obstacle or the like. For example, relative spatial positions of the obstacle and the device are directly positioned. For example, a position of the device is set to a spatial origin (0, 0, 0), and a spatial coordinate of the obstacle detected is (x, y, z). Then, a blocked region on a screen of the device is determined through geometric calculation.

The foregoing mainly describes the solutions of at least one embodiment from a perspective of a method. To implement the foregoing functions, an antenna-under-display management apparatus includes at least one of a corresponding hardware structure and a corresponding software module for performing each function. A person skilled in the art should easily be aware that, in combination with units and algorithm steps of the examples described in embodiments disclosed herein, embodiments described herein are implemented by hardware or a combination of hardware and computer software. Whether a function is performed by hardware or hardware driven by computer software depends on particular applications and design constraints of the technical solutions. A person skilled in the art is able to use different methods to implement the described functions for each particular application, but the implementation is not to be considered to go beyond the scope of embodiments described herein.

In at least one embodiment, the antenna-under-display management apparatus is divided into functional units based on the foregoing method examples. For example, each functional unit is obtained through division based on each corresponding function, or two or more functions is integrated into one processing unit. The integrated unit is implemented in a form of hardware, or is implemented in a form of a software functional unit. In embodiments described herein, division into the units is an example, and is merely a logical function division. In actual implementation, another division manner is used.

Figure 19:
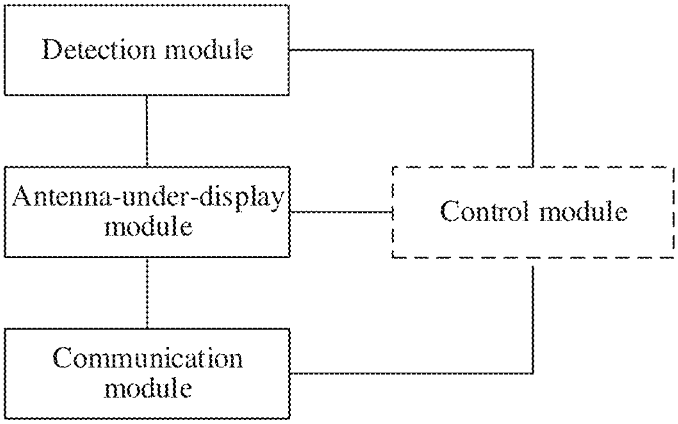
FIG. 19 is a schematic composition diagram of an antenna-under-display management apparatus according to at least one embodiment.

For example, an execution body of the method provided in embodiments described herein include a plurality of functional modules configured to perform the foregoing method. For example, the method provided in embodiments described herein is performed by a device. Refer to FIG. 19. The device includes: a detection module, an antenna-under-display module, and a communication module. Optionally, the device further includes a control module. The detection module is configured to obtain antenna-under-display blocking information of the device, and determine whether an antenna-under-display is blocked. This is specifically implemented in the foregoing contact or non-contact manner. The communication module is configured to communicate with another device, for example, perform signal transmission with the another device by using a first antenna set. The antenna-under-display module is used by the communication module to perform signal transmission. The antenna-under-display module is configured to send and/or receive an electromagnetic signal. In response to the communication module being an optical communication module, the antenna-under-display module is configured to send and/or receive an optical signal (Note: in at least one embodiment, the antenna-under-display module is referred to as an antenna for convenience, and actually, the antenna-under-display module is usually referred to as a sensor in the field of optical communication, that is, a transmit optical sensor or a receive optical sensor). The control module is configured to control the foregoing three functional modules, to implement the method provided in at least one embodiment. The communication module/the control module is further configured to perform one or more of the following actions: determining the first antenna set from a second antenna set, establishing a correspondence between one or more of a first region, a second region, and a third region and an antenna-under-display, in response to a quantity of antennas in the second antenna set being less than a quantity of antennas used by a transmission mode, determining whether to end current communication or reduce a quantity of used antennas, updating the first antenna set, updating the second antenna set, determining whether to update the first antenna set, and the like.

The detection module is a capacitance layer on a screen of the device, the foregoing sensor, or the like. The communication module is a communication interface, a transceiver (for example, a transceiver circuit), an input interface and/or an output interface, and the like. The control module is a processor.

Figure 20:
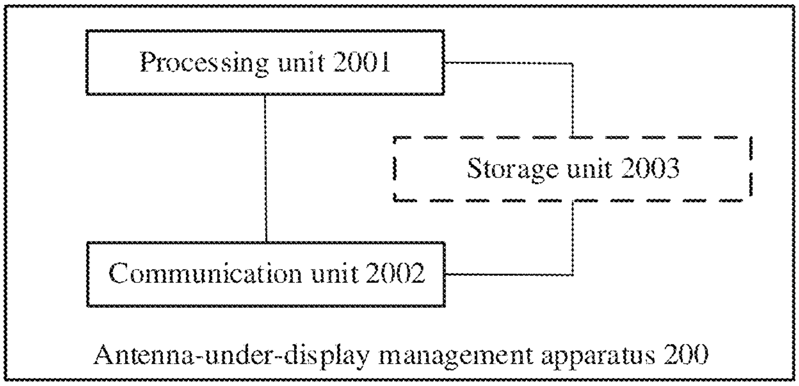
FIG. 20 is a schematic composition diagram of another antenna-under-display management apparatus according to at least one embodiment.

For another example, FIG. 20 is a schematic diagram of a structure of the antenna-under-display management apparatus (denoted as an antenna-under-display management apparatus 200) in the foregoing embodiments. The antenna-under-display management apparatus 200 includes a processing unit 2001 and a communication unit 2002. Optionally, the antenna-under-display management apparatus 200 further includes a storage unit 2003. The processing unit 2001 is configured to control and manage an action of the antenna-under-display management apparatus 200. For example, the processing unit 2001 is configured to perform steps in FIG. 4, FIG. 16, and FIG. 17, and/or an action performed by the antenna-under-display management apparatus 200 in another process described in embodiments herein. The processing unit 2001 communicates with another network entity by using the communication unit 2002, for example, perform signal transmission with a network device. The storage unit 2003 is configured to store program code and data of the antenna-under-display management apparatus 200.

For example, the antenna-under-display management apparatus 200 is a device, or is a chip or a chip system.

In response to the antenna-under-display management apparatus 200 being a device, the processing unit 2001 is a processor; and the communication unit 2002 is a communication interface, a transceiver, or an input interface and/or an output interface. Optionally, the transceiver is a transceiver circuit. Optionally, the input interface is an input circuit, and the output interface is an output circuit.

In response to the antenna-under-display management apparatus 200 being a chip or a chip system, the communication unit 2002 is a communication interface, an input interface and/or an output interface, an interface circuit, an output circuit, an input circuit, a pin, a related circuit, or the like on the chip or the chip system. The processing unit 2001 is a processor, a processing circuit, a logic circuit, or the like.

In response to an integrated unit in FIG. 20 being implemented in a form of a software functional module and sold or used as an independent product, the integrated unit is stored in a computer-readable storage medium. Based on such an understanding, the technical solutions of embodiments described herein essentially, or the part contributing to the current technology, or all or some of the technical solutions is implemented in the form of a software product. The computer software product is stored in a storage medium and includes several instructions for instructing a computer device (which is a personal computer, a server, or a network device) or a processor (processor) to perform all or some of the steps of the methods described in embodiments herein. The storage medium that stores the computer software product includes any medium that stores program code, such as a USB flash drive, a removable hard disk, a read-only memory (read-only memory, ROM), a random access memory (random access memory, RAM), a magnetic disk, or an optical disc.

Figure 21:
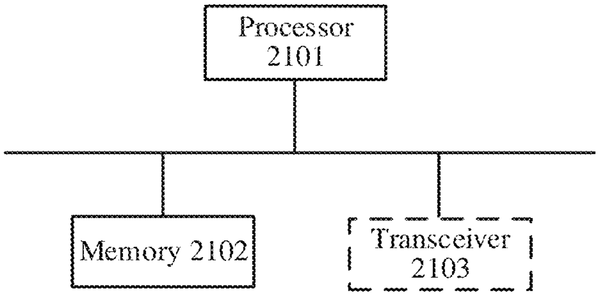
FIG. 21 is a schematic diagram of a hardware structure of an antenna-under-display management apparatus according to at least one embodiment.
Figure 22:
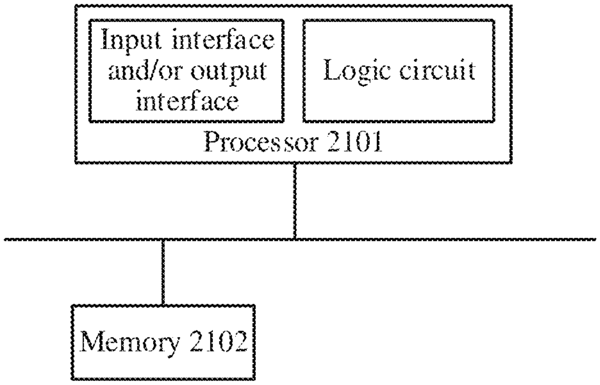
FIG. 22 is a schematic diagram of a hardware structure of another antenna-under-display management apparatus according to at least one embodiment.

At least one embodiment further provides a schematic diagram of a hardware structure of an antenna-under-display management apparatus. Refer to FIG. 21 or FIG. 22. The antenna-under-display management apparatus includes a processor 2101, and optionally, further includes a memory 2102 connected to the processor 2101.

The processor 2101 is a general-purpose central processing unit (central processing unit, CPU), a microprocessor, an application-specific integrated circuit (application-specific integrated circuit, ASIC), or one or more integrated circuits configured to control program execution of the solutions embodiment described herein. The processor 2101 alternatively includes a plurality of CPUs, and the processor 2101 is a single-core (single-CPU) processor or a multi-core (multi-CPU) processor. The processor herein is one or more devices, circuits, or processing cores configured to process data (for example, computer program instructions).

The memory 2102 is a ROM or another type of static storage device that stores static information and instructions, a RAM or another type of dynamic storage device that stores information and instructions, an electrically erasable programmable read-only memory (electrically erasable programmable read-only memory, EEPROM), a compact disc read-only memory (compact disc read-only memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that is used to carry or store expected program code in a form of an instruction or a data structure and that is accessed by a computer. This is not limited in embodiments described herein. The memory 2102 exists independently (in this case, the memory 2102 is located outside the antenna-under-display management apparatus, or is located inside the antenna-under-display management apparatus), or is integrated with the processor 2101. The memory 2102 includes computer program code. The processor 2101 is configured to execute the computer program code stored in the memory 2102, to implement the method provided in embodiments described herein.

In a first implementation, refer to FIG. 21. The antenna-under-display management apparatus further includes a transceiver 2103. The processor 2101, the memory 2102, and the transceiver 2103 are connected through a bus. The transceiver 2103 is configured to communicate with another device or a communication network. Optionally, the transceiver 2103 includes a transmitter and a receiver. A component configured to implement a receiving function in the transceiver 2103 is considered as a receiver. The receiver is configured to perform a receiving step in embodiments described herein. A component configured to implement a sending function in the transceiver 2103 is considered as a transmitter. The transmitter is configured to perform a sending step in embodiments described herein. In this case, the processor 2101 is configured to control and manage an action of the antenna-under-display management apparatus. For example, the processor 2101 is configured to perform steps in FIG. 4, FIG. 16, and FIG. 17, and/or an action performed by the antenna-under-display management apparatus in another process described in embodiments described herein. The processor 2101 communicates with another network entity by using the transceiver 2103, for example, perform signal transmission with a network device. The memory 2102 is configured to store program code and data of the antenna-under-display management apparatus.

In a second implementation, the processor 2101 includes a logic circuit and an input interface and/or an output interface. For example, the output interface is configured to perform a sending action in a corresponding method, and the input interface is configured to perform a receiving action in the corresponding method. In this case, the processor 2101 is configured to control and manage an action of the antenna-under-display management apparatus. For example, the processor 2101 is configured to perform steps in FIG. 4, FIG. 16, and FIG. 17, and/or an action performed by the antenna-under-display management apparatus in another process described in embodiments described herein. The processor 2101 communicates with another network entity by using an input interface and/or an output interface, for example, perform signal transmission with a network device. The memory 2102 is configured to store program code and data of the antenna-under-display management apparatus.

In an implementation process, the steps in the method provided in embodiment is completed by using a hardware integrated logic circuit in the processor, or by using instructions in a form of software. The steps of the methods disclosed with reference to embodiments described herein are directly performed by a hardware processor, or are performed by using a combination of hardware in the processor and a software module. The processor includes the foregoing sensor, or the processor integrates a function of the foregoing sensor.

At least one embodiment further provides a computer-readable storage medium, including computer-executable instructions. In response to the instructions being run on a computer, the computer is enabled to perform any one of the foregoing methods.

At least one embodiment further provides a computer program product, including computer-executable instructions. In response to the instructions being run on a computer, the computer is enabled to perform any one of the foregoing methods.

At least one embodiment further provides a communication system, including the foregoing antenna-under-display management apparatus (for example, a terminal). Optionally, the communication system further includes a network device or another terminal.

At least one embodiment further provides an antenna-under-display management apparatus, including a processor and an interface. The processor is coupled to a memory through the interface. In response to the processor executing a computer program or computer-executable instructions in the memory, any method provided in the foregoing embodiments is performed.

All or some of the foregoing embodiments is implemented by using software, hardware, firmware, or any combination thereof. In response to a software program being used to implement embodiments, all or some of embodiments are implemented in a form of a computer program product. The computer program product includes one or more computer instructions. In response to the computer program instructions being loaded and executed on a computer, all or some of the procedures or functions in embodiments described herein are generated. The computer is a general-purpose computer, a dedicated computer, a computer network, or another programmable apparatus. The computer instructions are stored in a computer-readable storage medium or are transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), a semiconductor medium (for example, a solid-state drive (solid-state drive, SSD)), or the like.

Although at least one embodiment is described, in a process of implementing at least one embodiment that claims protection, a person skilled in the art understands and implements another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or another unit implements several functions enumerated in the claims. Some measures are recorded in dependent claims that are different from each other, but this does not mean that these measures cannot be combined to produce a better effect.

Although at least one embodiment is described with reference to specific features and embodiments thereof, various modifications and combinations are able to be made without departing from the protection scope embodiments described herein. Correspondingly, the embodiments described herein and accompanying drawings are merely example descriptions defined by the appended claims, and are considered as any of or all modifications, variations, combinations or equivalents that cover the scope of embodiments described herein. A person skilled in the art is able to make various modifications and variations without departing from the scope of embodiments described herein. Embodiments described herein are intended to cover these modifications and variations provided that they fall within the scope of the claims and equivalent technologies thereof.

What is claimed is:

1. An antenna-under-display management method, comprising:

obtaining antenna-under-display blocking information of a device;

determining a plurality of first regions including one or more blocked regions and one or more unblocked regions, wherein the one or more blocked regions includes an antenna-under-display in at least one of the one or more blocked regions on a screen of the device and is a blocked antenna-under-display or at least a portion of an antenna-under-display array, the one or more blocked regions being extended outwards by a specific width to form an extended region;

determining a first antenna set in the plurality of first regions based on the antenna-under-display blocking information, wherein the first antenna set in the plurality of first regions is a subset of a second antenna set in the plurality of first regions, and the second antenna set is constituted by one or more unblocked antenna-under-display of the device in the one or more unblock regions; and performing signal transmission by using the first antenna set.

2. The method according to claim 1, wherein the obtaining the antenna-under-display blocking information of the device includes:

obtaining screen blocking information of the device, and determining the antenna-under-display blocking information based on the screen blocking information.

3. The method according to claim 2, wherein the obtaining the screen blocking information of the device, and determining the antenna-under-display blocking information based on the screen blocking information includes:

determining a blocked region from the one or more blocked regions on the screen of the device; and determining that the antenna-under-display in the blocked region on the screen of the device is the blocked antenna-under-display, or in response to the antenna-under-display being the antenna-under-display array, and a ratio of a quantity of antenna elements in the blocked region on the screen of the device to the quantity of antenna elements in the antenna-under-display array to which the quantity of antenna elements in the blocked region on the screen of the device belongs being greater than a first threshold, determining that the antenna-under-display in the blocked region on the screen of the device is the blocked antenna-under-display.

4. The method according to claim 3, wherein the determining the blocked region on the screen of the device includes:

determining the blocked region based on a touched region on the screen of the device.

5. The method according to claim 3, wherein the determining the blocked region on the screen of the device includes:

obtaining capacitance change information of the blocked region on the screen of the device; and determining the blocked region based on a region in which capacitance changes.

6. The method according to claim 3, wherein the determining the blocked region on the screen of the device includes:

performing blocking detection on the screen of the device by using one or more sensors, to obtain a detection result; and determining the blocked region based on the detection result.

7. The method according to claim 3, wherein the determining the blocked region on the screen of the device includes:

determining the blocked region on the screen of the device based on a position of an obstacle, in a first space, that blocks the screen of the device, wherein projection of a bottom surface of the first space on a horizontal plane is a screen surface of the device, and a height is a preset value.

8. The method according to claim 3, wherein the determining the blocked region on the screen of the device includes:

performing blocking detection on a first space by using one or more sensors, wherein projection of a bottom surface of the first space on a horizontal plane is a screen surface of the device, and a height is a preset value; and determining the blocked region based on the blocked region formed by projecting a position of an obstacle that blocks the screen of the device and that is in the first space onto the screen of the device.

9. The method according to claim 1, wherein the screen of the device comprises the plurality of first regions, there is a correspondence between the plurality of first regions and an antenna-under-display, and wherein the obtaining the antenna-under-display blocking information of the device includes:

in response to a blocked proportion of the plurality of first regions corresponding to a first antenna-under-display being greater than a second threshold, determining that the first antenna-under-display is blocked; and in response to the blocked proportion of the plurality of first regions corresponding to the first antenna-under-display being less than or equal to the second threshold, determining that the first antenna-under-display is not blocked, wherein the first antenna-under-display is one of antenna-under-displays of the device.

10. The method according to claim 1, wherein a first space comprises M*N subspaces, M is a first integer greater than 1, N is a second integer greater than 0, wherein projection of a bottom surface of the first space on a horizontal plane is a screen surface of the device, a height is a preset value, the bottom surface of the first space including M second regions, there is a correspondence between a second region and an antenna-under-display, and a space uses the second region as the bottom surface and has the height being the preset value including N subspaces, and wherein the obtaining the antenna-under-display blocking information of the device includes:

in response to a ratio of an area formed by projecting an obstacle that blocks the screen of the device and that is in a first subspace onto the screen to an area of the second region corresponding to a first antenna-under-display being greater than a third threshold, determining that the first antenna-under-display is blocked; and in response to the ratio of the area formed by projecting the obstacle that blocks the screen of the device and that is in the first subspace onto the screen to the area of the second region corresponding to the first antenna-under-display being less than or equal to the third threshold, determining that the first antenna-under-display is not blocked, wherein the first subspace is a subspace, closest to the screen of the device among subspaces occupied by the obstacle, in the N subspaces corresponding to the area of the second region corresponding to the first antenna-under-display, the first antenna-under-display is one of antenna-under-displays of the device, and the third threshold corresponds to the first subspace.

11. An antenna-under-display management apparatus, comprising:

at least one processor; and a non-transitory computer-readable medium including computer-executable instructions that, when executed by the processor, cause the processor to perform operations for:

obtaining antenna-under-display blocking information of a device;

determining a plurality of first regions including one or more blocked regions and one or more unblocked regions, wherein the one or more blocked regions includes an antenna-under-display in at least one of the one or more blocked regions on a screen of the device is a blocked antenna-under-display or at least a portion of an antenna-under-display array, the one or more blocked regions being extended outwards by a specific width to form an extended region;

determining a first antenna set in the plurality of first regions based on the antenna-under-display blocking information, wherein the first antenna set in the plurality of first regions is a subset of a second antenna set in the plurality of first regions, and the second antenna set is constituted by one or more unblocked antenna-under-display of the device in the one or more unblock regions; and performing signal transmission by using the first antenna set.

12. The apparatus according to claim 11, wherein the processor is further configured to obtain the antenna-under-display blocking information of the device by:

obtaining screen blocking information of the device, and determining the antenna-under-display blocking information based on the screen blocking information.

13. The apparatus according to claim 12, wherein the processor is further configured to obtain the screen blocking information of the device, and to determine the antenna-under-display blocking information based on the screen blocking information by:

determining a blocked region from the one or more blocked regions on the screen of the device; and determining that the antenna-under-display in the blocked region on the screen of the device is the blocked antenna-under-display, or in response to the antenna-under-display being the antenna-under-display array, and a ratio of a quantity of antenna elements in the blocked region on the screen of the device to a quantity of antenna elements in the antenna-under-display array to which the quantity of antenna elements in the blocked region on the screen of the device belongs being greater than a first threshold, determining that the antenna-under-display in the blocked region on the screen of the device is the blocked antenna-under-display.

14. The apparatus according to claim 13, wherein the processor is further configured to determine the blocked region on the screen of the device by:

determining the blocked region based on a touched region on the screen of the device.

15. The apparatus according to claim 13, wherein the processor is further configured to determine the blocked region on the screen of the device by:

obtaining capacitance change information of the blocked region on the screen of the device; and determining the blocked region based on the blocked region in which capacitance changes.

16. The apparatus according to claim 13, wherein the processor is further configured to determine the blocked region on the screen of the device by:

performing blocking detection on the screen of the device by using one or more sensors, to obtain a detection result; and determining the blocked region based on the detection result.

17. The apparatus according to claim 13, wherein the processor is further configured to determine the blocked region on the screen of the device by:

determining the blocked region on the screen of the device based on a position of an obstacle, in a first space, that blocks the screen of the device, wherein projection of a bottom surface of the first space on a horizontal plane is a screen surface of the device, and a height is a preset value.

18. The apparatus according to claim 13, wherein the processor is further configured to determine the blocked region on the screen of the device by:

performing blocking detection on a first space by using one or more sensors, wherein projection of a bottom surface of the first space on a horizontal plane is a screen surface of the device, and a height is a preset value; and determining the blocked region based on the blocked region formed by projecting a position of an obstacle that blocks the screen of the device and that is in the first space onto the screen of the device.

19. The apparatus according to claim 11, wherein the screen of the device includes a plurality of first regions, there is a correspondence between the plurality of first regions and an antenna-under-display, and the processor is further configured to obtain the antenna-under-display blocking information of the device by:

in response to a blocked proportion of the plurality of first regions corresponding to a first antenna-under-display being greater than a second threshold, determining that the first antenna-under-display is blocked; and in response to the blocked proportion of the plurality of first regions corresponding to the first antenna-under-display being less than or equal to the second threshold, determining that the first antenna-under-display is not blocked, wherein the first antenna-under-display is one of antenna-under-displays of the device.

20. The apparatus according to claim 11, wherein a first space comprises M*N subspaces, M is a first integer greater than 1, N is a second integer greater than 0, wherein projection of a bottom surface of the first space on a horizontal plane is a screen surface of the device, a height is a preset value, the bottom surface of the first space comprises M second regions, there is a correspondence between a second region and an antenna-under-display, a space that uses the second region as the bottom surface and the height is the preset value comprises N subspaces, and the processor is further configured to obtain the antenna-under-display blocking information of the device by:

in response to a ratio of an area formed by projecting an obstacle that blocks the screen of the device and that is in a first subspace onto the screen to an area of a second region corresponding to a first antenna-under-display being greater than a third threshold, determining that the first antenna-under-display is blocked; and in response to the ratio of the area formed by projecting the obstacle that blocks the screen of the device and that is in the first subspace onto the screen to the area of the second region corresponding to the first antenna-under-display being less than or equal to the third threshold, determining that the first antenna-under-display is not blocked, wherein the first subspace is a subspace, closest to the screen of the device among subspaces occupied by the obstacle, in the N subspaces corresponding to the area of the second region corresponding to the first antenna-under-display, the first antenna-under-display is one of antenna-under-displays of the device, and the third threshold corresponds to the first subspace.

* * * * *